United States Patent
Manolakos et al.

(10) Patent No.: US 11,177,917 B2
(45) Date of Patent: Nov. 16, 2021

(54) PORT GROUP INDICATION AND PORT SUBSETS IN A CSI-RS RESOURCE FOR NEW RADIO (NR)

(71) Applicant: QUALCOMM Incorporated, San Diego, CA (US)

(72) Inventors: Alexandros Manolakos, San Diego, CA (US); Yu Zhang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/608,447

(22) PCT Filed: Apr. 19, 2018

(86) PCT No.: PCT/CN2018/083708
§ 371 (c)(1),
(2) Date: Oct. 25, 2019

(87) PCT Pub. No.: WO2018/201908
PCT Pub. Date: Nov. 8, 2018

(65) Prior Publication Data
US 2020/0052847 A1 Feb. 13, 2020

Related U.S. Application Data

(63) Continuation of application No. PCT/CN2017/082739, filed on May 2, 2017.

(51) Int. Cl.
*H04B 7/00* (2006.01)
*H04L 5/00* (2006.01)
(Continued)

(52) U.S. Cl.
CPC ......... *H04L 5/0048* (2013.01); *H04B 17/345* (2015.01); *H04W 72/1263* (2013.01)

(58) Field of Classification Search
CPC ............... H04W 72/04; H04W 72/042; H04W 72/0446; H04W 72/048; H04W 72/1278;
(Continued)

(56) References Cited

U.S. PATENT DOCUMENTS

| 8,861,430 | B2 * | 10/2014 | Liao | H04W 72/085 |
| | | | | 370/318 |
| 8,976,770 | B2 * | 3/2015 | Kang | H04W 72/04 |
| | | | | 370/338 |

(Continued)

FOREIGN PATENT DOCUMENTS

| CN | 103391576 A | 11/2013 |
| CN | 105262574 A | 1/2016 |

(Continued)

OTHER PUBLICATIONS

International Search Report and Written Opinion—PCT/CN2017/082739—ISA/EPO—dated Jan. 29, 2018.
(Continued)

*Primary Examiner* — Dmitry Levitan
(74) *Attorney, Agent, or Firm* — Loza & Loza, LLP

(57) ABSTRACT

Aspects of the present disclosure provide channel state information reference signal (CSI-RS) resources that specify the resource elements (REs) on which a CSI-RS may be transmitted, along with a set of ports at the base station from which the CSI-RS may be transmitted. Within the set of ports for particular CSI-RS resource, one or more port groups may further be configured. Each port group identifies a group of ports associated with a channel. In some examples, a port group identifies the ports on which CSI may be measured. Other ports within the set of ports that are outside the port group may be utilized for interference measurement.

54 Claims, 17 Drawing Sheets

(51) Int. Cl.
*H04B 17/345* (2015.01)
*H04W 72/12* (2009.01)

(58) Field of Classification Search
CPC ............ H04W 72/1289; H04W 16/24; H04W 28/0289; H04W 88/085
USPC ........................................ 370/310, 328, 329
See application file for complete search history.

(56) References Cited

U.S. PATENT DOCUMENTS

| | | | |
|---|---|---|---|
| 9,173,205 B2 * | 10/2015 | Lee .................. | H04W 72/0453 |
| 9,451,488 B2 * | 9/2016 | Park ...................... | H04W 24/08 |
| 9,479,306 B2 * | 10/2016 | Mazzarese ........... | H04B 7/0626 |
| 9,520,973 B2 * | 12/2016 | Kim ...................... | H04L 5/0048 |
| 9,559,820 B2 | 1/2017 | Geirhofer et al. | |
| 9,736,803 B2 * | 8/2017 | Sun ....................... | H04W 16/04 |
| 9,999,074 B2 * | 6/2018 | Moon .................. | H04B 7/0626 |
| 10,225,054 B2 * | 3/2019 | Shin ...................... | H04L 5/0051 |
| 10,498,505 B2 * | 12/2019 | Jin ....................... | H04B 7/0469 |
| 10,812,162 B2 * | 10/2020 | Nam ..................... | H04B 7/0413 |
| 2013/0163544 A1 | 6/2013 | Lee et al. | |
| 2015/0003442 A1 | 1/2015 | Sun et al. | |
| 2016/0112167 A1 * | 4/2016 | Xu ....................... | H04W 72/042 370/329 |
| 2017/0180194 A1 * | 6/2017 | Noh ..................... | H04B 7/0617 |
| 2020/0052847 A1 * | 2/2020 | Manolakos ........... | H04L 5/0094 |

FOREIGN PATENT DOCUMENTS

| | | | |
|---|---|---|---|
| CN | 105391479 | A | 3/2016 |
| EP | 2849481 | A1 | 3/2015 |
| GN | 102263723 | A | 11/2011 |
| GN | 103179664 | A | 6/2013 |
| WO | 2012112281 | A2 | 8/2012 |
| WO | 2014113087 | A1 | 7/2014 |

OTHER PUBLICATIONS

International Search Report and Written Opinion—PCT/CN2018/083708—ISA/EPO—dated Jul. 9, 2018.

NTT Docomo: "On CSI Measurement for NR", 3GPP Draft, RI-1705722, 3GPP TSG RAN WG1 Meeting #88bis, CSI Measurement, 3rd Generation Partnership Project (3GPP), Mobile Competence Centre, 650, Route Des Lucioles, F-06921 Sophia-Antipolis Cedex, France, vol. RAN WG1, no. Spokane, USA, Apr. 3, 2017-Apr. 7, 2017, Mar. 25, 2017 (Mar. 25, 2017), XP051252138, pp. 1-7, Retrieved from the Internet:URL:http://www.3gpp.org/ftp/tsg_ran/WG1_RL1/TSGRI_88b/Docs/ [retrieved on Mar. 25, 2017] pp. 2, 5, Figure 4.

Supplementary European Search Report—EP 18794354—Search Authority—Munich—dated Nov. 12, 2020.

Zte., et al., "Beam Related Indication for Beam Management", 3GPP Draft, RI-1701799, 3GPP TSG RAN WG1 Meeting #88, Beam Related Indication for Beam Management, 3rd Generation Partnership Project (3GPP), Mobile Competence Centre, 650, Route Des Lucioles, F-06921 Sophia-Antipolis Cedex, France, vol. RAN WG1, no. Athens, Greece, Feb. 13, 2017-Feb. 17, 2017, Feb. 12, 2017 (Feb. 12, 2017), XP051208965, 5 Pages, Retrieved from the Internet: URL:http://www.3gpp.org/ftp/Meetings_3GPP_SYNC/RAN1/Docs/ [retrieved on Feb. 12, 2017] Figure 1.

* cited by examiner

| Number of Ports Assigned to UE (Out of 6 Total Ports) | Allowed Values |
|---|---|
| 1 port | 100000, 010000, ...., 000001 |
| 2 ports | 110000, 000011 |
| 3 ports | 111000, 000111 |
| 4 ports | 111100, 001111 |
| 5 ports | 111110, 011111 |
| 6 ports | 111111 |

FIG. 9

| Number of Ports Assigned to UE (Out of 12 Total Ports) | Allowed Values |
|---|---|
| 1 port | 100000000000, 010000000000, ..., 000000000001 |
| 2 ports | 110000000000, 001100000000, 000011000000, 000000110000, 000000001100, 000000000011 |
| 3 ports | 111000000000, 000111000000, 000000111000, 000000000111 |
| 4 ports | 111100000000, 000011110000, 000000001111 |
| 5 ports | 111110000000, 000000011111 |
| 6 ports | 111111000000, 000000111111 |
| 7 ports | 111111100000, 000001111111 |
| 8 ports | 111111110000, 000011111111 |

FIG. 10

| Number of Ports Assigned to UE (Out of 8 Total Ports) | Allowed Values |
|---|---|
| 1 port | 10000000, 01000000, ..., 00000001 |
| 2 ports | 11000000, 00110000, 00001100, 00000011 |
| 3 ports | 11100000, 00000111 |
| 4 ports | 11110000, 00001111 |
| 5 ports | 11111000, 00011111 |
| 6 ports | 11111100, 00111111 |
| 7 ports | 11111110, 01111111 |
| 8 ports | 11111111 |

FIG. 11

PORT GROUP INDICATION AND PORT SUBSETS IN A CSI-RS RESOURCE FOR NEW RADIO (NR)

PRIORITY CLAIM

This application claims priority to and the benefit of PCT Application No. PCT/CN2017/082739 filed in the Chinese Patent Office on May 2, 2017, the entire content of which is incorporated herein by reference as if fully set forth below in its entirety and for all applicable purposes.

TECHNICAL FIELD

The technology discussed below relates generally to wireless communication systems, and more particularly, to transmission of a channel state information reference signal (CSI-RS) in wireless communication systems.

INTRODUCTION

Wireless transmissions between a base station and one or more user equipment (UE) within a cell may utilize Multiple Input Multiple Output (MIMO) technology to enable higher data rates to be achieved with improved spectral efficiency. MIMO employs multiple antennas at the transmitter and receiver and exploits multipath signal propagation to transmit and/or receive multiple streams simultaneously. The multiple streams may be transmitted to a single UE, referred to as single-user MIMO (SU-MIMO), or to multiple UEs, referred to as multi-user MIMO (MU-MIMO).

In order to support high dimensional SU-MIMO and MU-MIMO, three different types of reference signals are typically transmitted on the downlink. The first reference signal is the downlink modulation reference signal (DMRS), which aids with demodulation of downlink MIMO streams. The second reference signal is the cell specific reference signal (C-RS), and the third reference signal is the channel state information reference signal (CSI-RS). The C-RS and CSI-RS may each be utilized by a user equipment to estimate the channel and return channel state information indicating the quality of the channel to the base station. However, the C-RS is defined for up to four transmit antenna (four antenna ports), whereas the CSI-RS is defined for over four different antenna ports. In order to minimize overhead, the CSI-RS is utilized only for CSI measurements and is transmitted in a fraction of subframes or slots. This is in contrast to the C-RS, which is utilized for both demodulation and CSI measurements, and therefore, is transmitted every subframe or slot.

With the introduction of massive MIMO (e.g., up to hundreds of transmit antennas at the base station) in next generation (5G) wireless systems, such as the New Radio (NR) wireless system, significant gains in data rates and link reliability may be achieved by using more antennas at the base station to focus downlink transmissions towards a user equipment. To accommodate various antenna configurations and enable accurate channel estimation, improvements to the downlink reference signals continue to be researched and developed.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure relate to channel state information reference signal (CSI-RS) resources that specify the resource elements (REs) on which a CSI-RS may be transmitted, along with a set of ports at the base station (scheduling entity) from which the CSI-RS may be transmitted. Within the set of ports for particular CSI-RS resource, one or more port groups may further be configured. Each port group identifies a group of ports associated with a channel. In some examples, a port group identifies the ports on which CSI may be measured by a UE (scheduled entity). Other ports within the set of ports that are outside the port group may be utilized for interference measurement by the UE.

In one aspect of the disclosure, method of wireless communication between a scheduling entity and a set of one or more scheduled entities in a wireless communication network is provided. The method includes configuring a plurality of channel state information reference signal (CSI-RS) resources, each identifying a set of one more resource elements on which to transmit a CSI-RS and a set of one or more ports from which to transmit the CSI-RS. The method further includes, for each of the plurality of CSI-RS resources, configuring a set of one or more port groups, each identifying a group of ports within the respective set of ports associated with a channel. The method further includes selecting a CSI-RS resource from the plurality of CSI-RS resources and a port group from the set of one or more port groups of the CSI-RS resource for a scheduled entity of the set of one or more scheduled entities, transmitting an indication of the CSI-RS resource and the port group selected for the scheduled entity to the scheduled entity, and transmitting the CSI-RS to the scheduled entity utilizing the set of one or more resource elements and the set of one or more ports associated with the CSI-RS resource.

Another aspect of the disclosure provides scheduling entity in wireless communication with a set of one or more scheduled entities in a wireless communication network. The scheduling entity includes a processor, a transceiver communicatively coupled to the processor, and a memory communicatively coupled to the processor. The processor is configured to configure and maintain within the memory a plurality of channel state information reference signal (CSI-RS) resources, each identifying a set of one more resource elements on which to transmit a CSI-RS and a set of one or more ports from which to transmit the CSI-RS. The processor is further configured to, for each of the plurality of CSI-RS resources, configure and maintain within the memory a set of one or more port groups, each identifying a group of ports within the respective set of ports associated with a channel. The processor is further configured to select a CSI-RS resource from the plurality of CSI-RS resources and a port group from the set of one or more port groups of the CSI-RS resource for a scheduled entity of the set of one or more scheduled entities, transmit an indication of the CSI-RS resource and the port group selected for the scheduled entity to the scheduled entity via the transceiver, and transmit the CSI-RS to the scheduled entity utilizing the set of one or more, resource elements and the set of one or more ports associated with the CSI-RS resource.

Another aspect of the disclosure provides a scheduling entity in wireless communication with a set of one or more scheduled entities in a wireless communication network. The scheduling entity includes means for configuring a plurality of channel state information reference signal (CSI-RS) resources, each identifying a set of one more resource elements on which to transmit a CSI-RS and a set of one or more ports from which to transmit the CSI-RS. The scheduling entity further includes, for each of the plurality of CSI-RS resources, means for configuring a set of one or more port groups, each identifying a group of ports within the respective set of ports associated with a channel. The scheduling entity further includes means for selecting a CSI-RS resource from the plurality of CSI-RS resources and a port group from the set of one or more port groups of the CSI-RS resource for a scheduled entity of the set of one or more scheduled entities, means for transmitting an indication of the CSI-RS resource and the port group selected fur the scheduled entity to the scheduled entity, and means for transmitting the CSI-RS to the scheduled entity utilizing the set of one or more resource elements and the set of one or more ports associated with the CSI-RS resource.

Another aspect of the disclosure provides method of wireless communication between a scheduled entity and a scheduling entity in a wireless communication network. The method includes receiving an indication of a channel state information reference signal (CSI-RS) resource identifying a set of one more resource elements on which to receive a CSI-RS and a set of one or more ports from which to receive the CSI-RS, receiving a port group indication of a port group that includes a group of ports within the set of one or more ports of the CSI-RS resource on which to perform channel estimation of a channel, and receiving the CSI-RS on the set of one or more resource elements and the set of one or more ports associated with the CSI-RS resource. The method further includes calculating channel state information (CSI) on the group of ports indicated by the port group indication and transmitting the CSI to the scheduling entity.

Another aspect of the disclosure provides a scheduled entity in wireless communication with a scheduling entity in a wireless communication network. The scheduled entity includes a processor, a transceiver communicatively coupled to the processor, and a memory communicatively coupled to the processor. The processor is configured to receive an indication of a channel state information reference signal (CSI-RS) resource identifying a set of one more resource elements on which to receive a CSI-RS and a set of one or more ports from which to receive the CSI-RS via the transceiver, receive a port group indication of a port group that includes a group of ports within the set of one or more ports of the CSI-RS resource on which to perform channel estimation of a channel via the transceiver, and receive the CSI-RS on the set of one or more resource elements and the set of one or more ports associated with the CSI-RS resource via the transceiver. The processor is further configured to calculate channel state information (CSI) on the group of ports indicated by the port group indication and transmit the CSI to the scheduling entity via the transceiver.

Another aspect of the disclosure provides a scheduled entity in wireless communication with a scheduling entity in a wireless communication network. The scheduled entity includes means for receiving an indication of a channel state information reference signal (CSI-RS) resource identifying a set of one more resource elements on which to receive a CSI-RS and a set of one or more ports from which to receive the CSI-RS, means for receiving a port group indication of a port group that includes a group of ports within the set of one or more ports of the CSI-RS resource on which to perform channel estimation of a channel, and means for receiving the CSI-RS on the set of one or more resource elements and the set of one or more ports associated with the CSI-RS resource. The scheduled entity further includes means for calculating channel state information (CSI) on the group of ports indicated by the port group indication and means for transmitting the CSI to the scheduling entity.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion while exemplary embodiments may be discussed below as device, system, or method embodiments it should be understood that such exemplary embodiments can be implemented in various devices, systems, and methods.

BRIEF DESCRIPTION OF THE DRAWINGS

FIG. 9 is a diagram illustrating an example of port groups for a CSI-RS resource with six ports according to some aspects of the present disclosure.

FIG. 10 is a diagram illustrating an example of port groups for a CSI-RS resource with twelve ports according to some aspects of the present disclosure.

FIG. 11 is a diagram illustrating an example of port groups for a CSI-RS resource with eight ports according to some aspects of the present disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
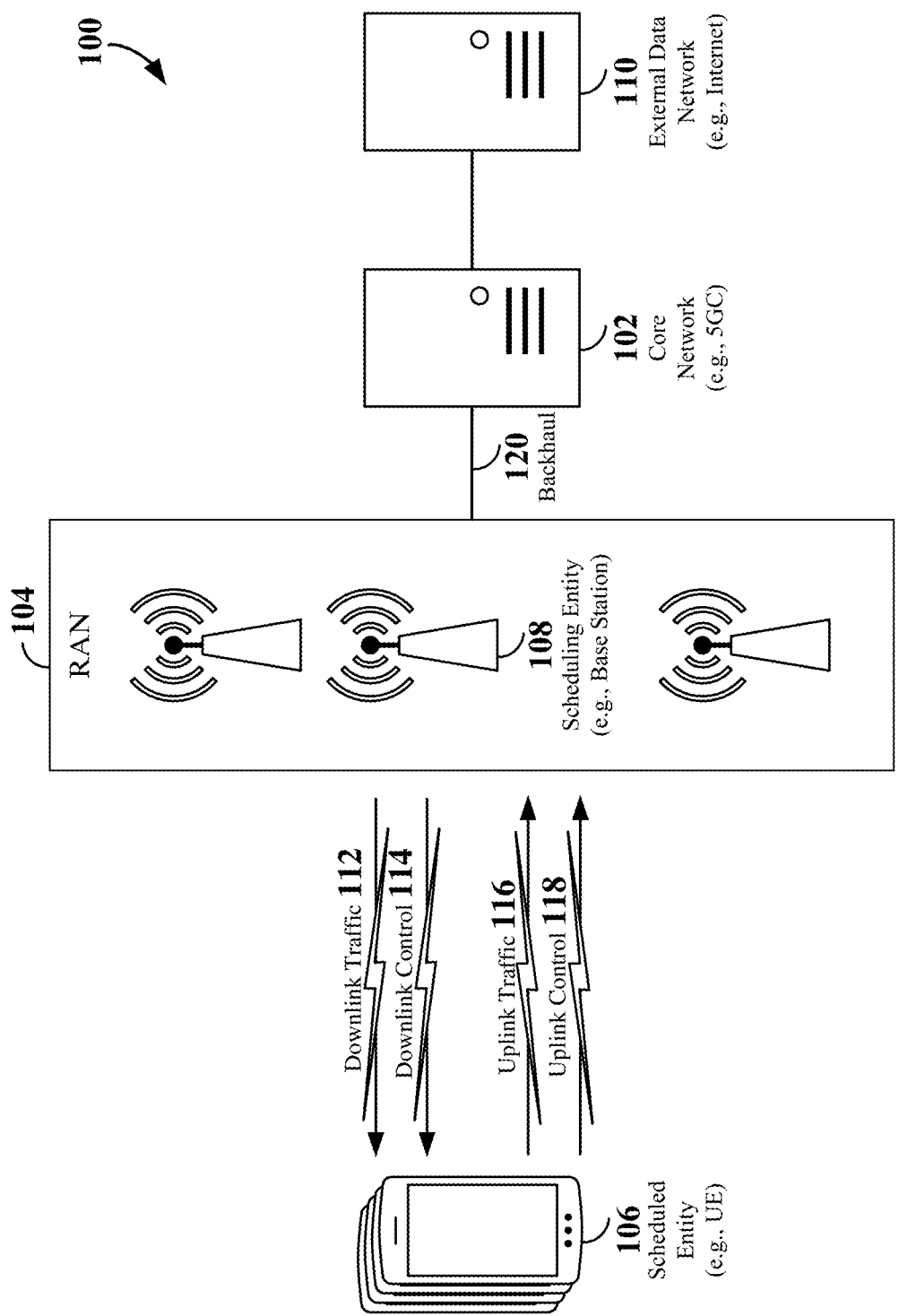
FIG. 1 is a schematic illustration of a wireless communication system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copier, a quad-copier, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. in accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
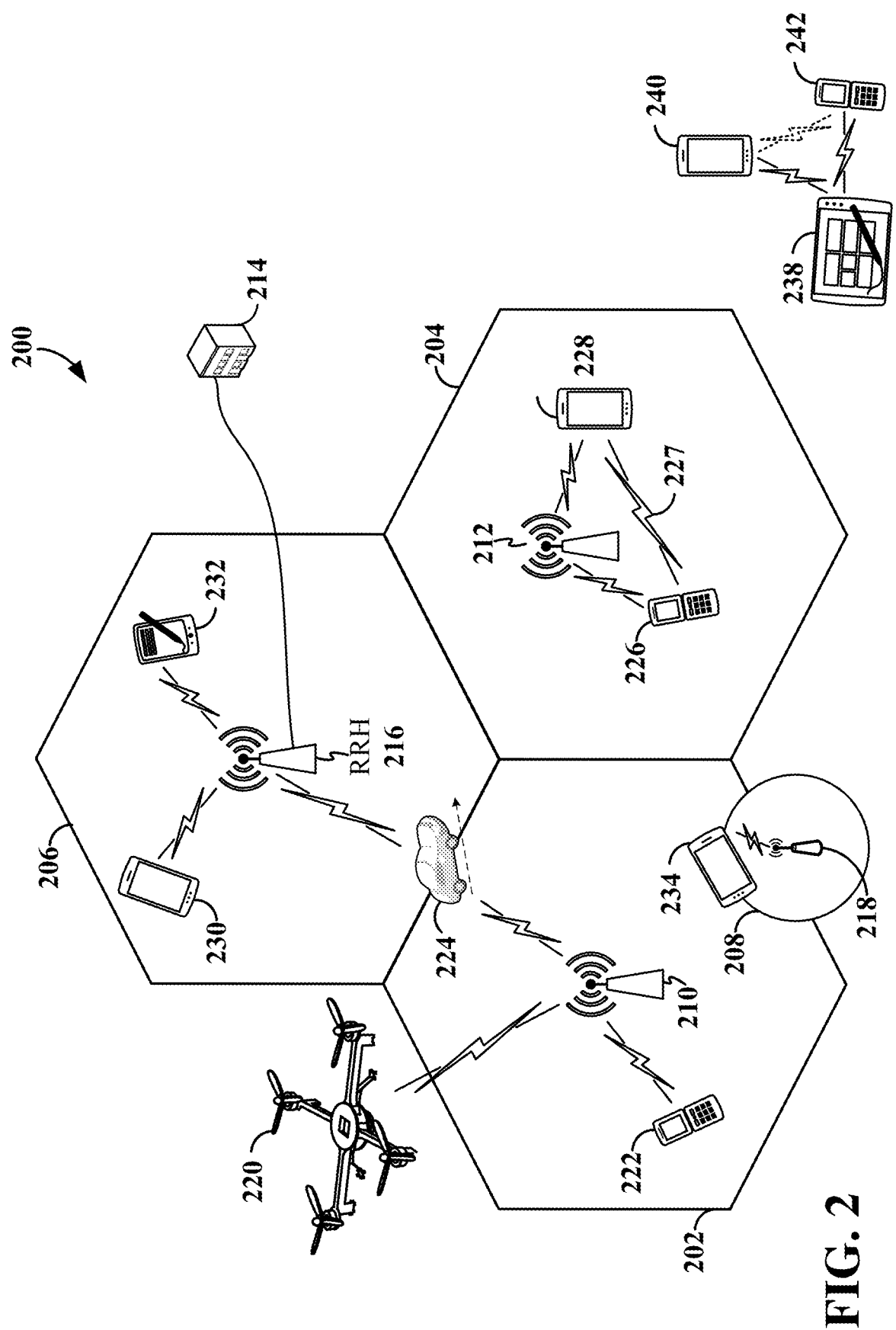
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell, In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212), in a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 include sidelink traffic and sidelink control. Sidelink control information may in some examples include a request signal, such as a request-to-send (RTS), a source transmit signal (STS), and/or a direction selection signal (DSS). The request signal may provide for a scheduled entity to request a duration of time to keep a sidelink channel available for a sidelink signal. Sidelink control information may further include a response signal, such as a clear-to-send (CTS) and/or a destination receive signal (DRS). The response signal may provide for the scheduled entity to indicate the availability of the sidelink channel, e.g., for a requested duration of time. An exchange of request and response signals (e.g., handshake) may enable different scheduled entities performing sidelink communications to negotiate the availability of the sidelink channel prior to communication of the sidelink traffic information.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data traffic is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
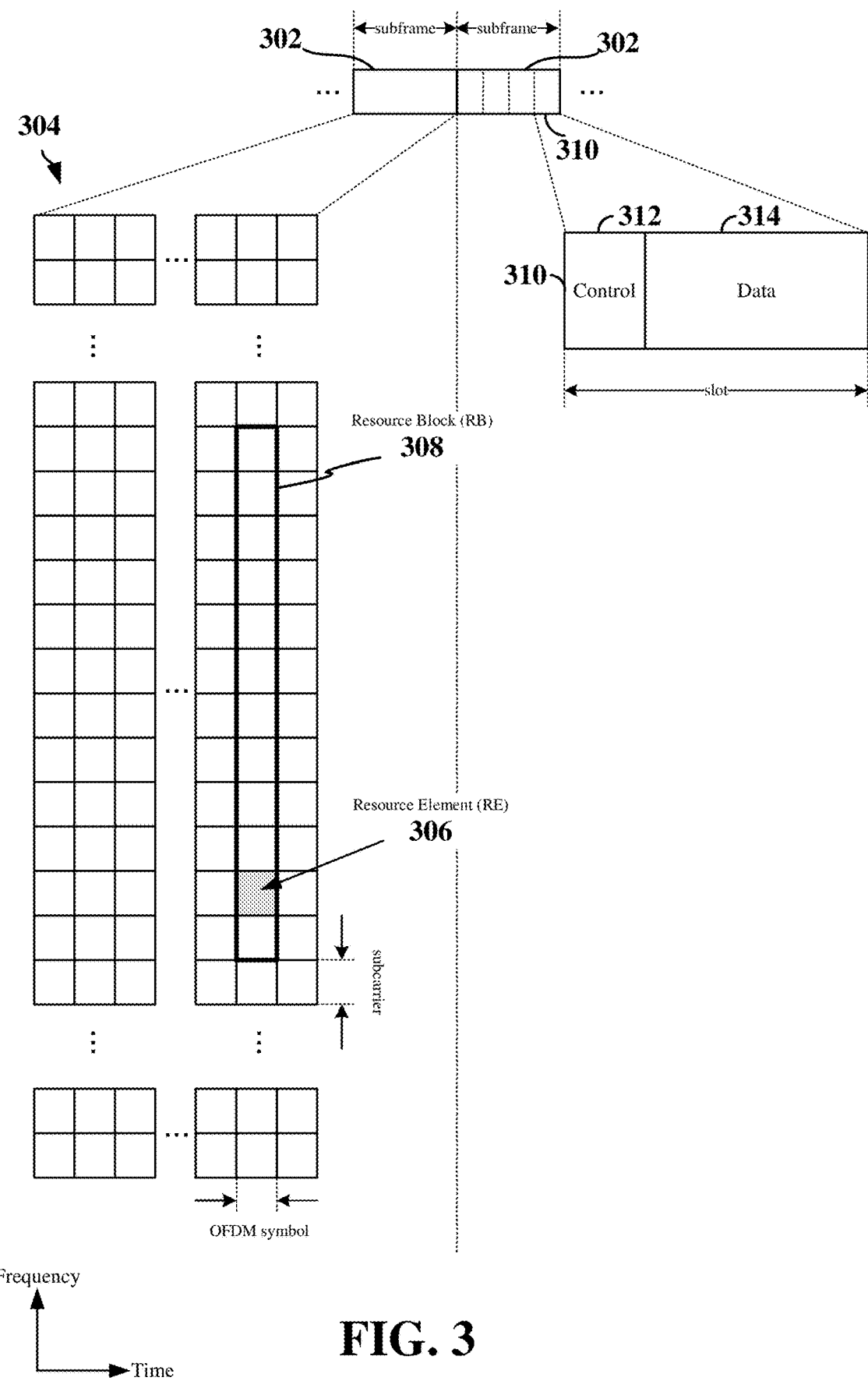
FIG. 3 is a diagram illustrating an example of a frame structure for use in a radio access network.

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information.

In some examples, a block of REs may be referred to as a physical resource block (PRB) or more simply a resource block (RB) 308, which contains any suitable number of consecutive subcarriers in the frequency domain in one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG) or sub-band. A set of sub-bands may span the entire bandwidth. Scheduling of UEs (scheduled entities) for downlink or uplink transmissions typically involves scheduling one or more resource elements 306 within one or more sub-bands. Thus, a UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs. Any number of resource blocks or resource block groups (e.g., groups of sub-carriers and OFDM symbols) may be utilized within a sub frame or slot.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308. For example, downlink reference signals (DL-RS) may include Cell-specific RS (CRS) for up to 4-layer spatial multiplexing in MIMO systems or Channel State information RS (CSI-RS) for over 4-layer spatial multiplexing in MIMO systems, along with UE-specific RS (UE-RS).

In a DL transmission, the transmitting device (e.g., the scheduling entity 108) may allocate one or more REs 306 (e.g., within a control region 312) to carry DL control information including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities. The PCFICH provides information to assist a receiving device in receiving and decoding the PDCCH. The PDCCH carries downlink control information (DCI) including hut not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. In some examples, the control information may include a scheduling request (SR), i.e., request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data traffic. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

These physical channels described above are generally multiplexed and mapped to transport channels for handling at the medium access control (MAC) layer. Transport channels early blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
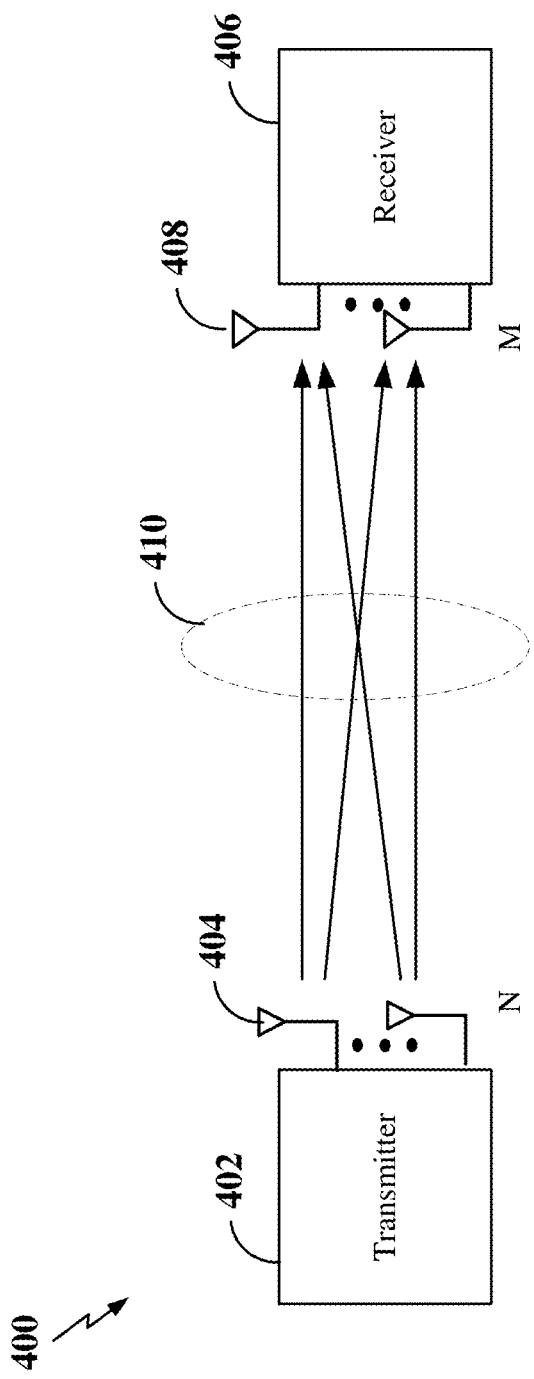
FIG. 4 is a diagram illustrating an example of a wireless communication system supporting Multiple Input Multiple Output (MIMO) technology according to some aspects of the present disclosure.

FIG. 4 illustrates an example of a wireless communication system 400 supporting MIMO technology. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduled entity, a scheduling entity or other wireless communication device.

The use of MIMO technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The traffic streams may be transmitted to a single scheduled entity or UE to increase the data rate or to multiple scheduled entities or UEs to increase the overall system capacity, the latter being referred to as multi-user MIMO (MU-MIMO). This is achieved by spatially precoding each traffic stream (i.e., applying a scaling of an amplitude and a phase) and then transmitting each spatially precoded stream through multiple transmit antennas on the downlink. The spatially precoded traffic streams arrive at the UE(s) with different spatial signatures, which enables each of the UE(s) to recover the one or more traffic streams destined for that UE. On the uplink, each scheduled entity or UE transmits a spatially precoded traffic stream, which enables the scheduling entity to identify the source of each spatially precoded traffic stream.

The number of traffic streams or layers corresponds to the rank of the transmission. In general, the rank of the MIMO system 400 is limited by the number of transmit or receive antennas 404 or 408, whichever is lower. In addition, the channel conditions at the scheduled entity, as well as other considerations, such as the available resources at the scheduling entity, may also affect the transmission rank. For example, the rank (and therefore, the number of traffic streams) assigned to a particular scheduled entity on the downlink may be determined based on a rank indicator (RI) transmitted from the scheduled entity to the scheduling entity. The RI may be determined based on the antenna configuration (e.g., the number of transmit and receive antennas) and the Signal to Interference Noise Ratio (SINR) on each of the receive antennas. The RI may indicate, for example, the number of layers that may be supported under the current channel conditions. The scheduling entity may use the RI, along with resource information (e.g., the available resources and amount of data to be scheduled for the scheduled entity), to assign a transmission rank to the scheduled entity.

In Time Division Duplex (TDD) systems, the uplink and downlink are reciprocal in that each uses different time slots of the same frequency bandwidth. As such, in TDD systems, the scheduling entity may assign the rank based on uplink SINR measurements (e.g., based on a Sounding Reference Signal (SRS) transmitted from the scheduled entity or other pilot signal). Based on the assigned rank, the scheduling entity may then transmit the CSI-RS with separate C-RS sequences for each layer to provide for multi-layer channel estimation. From the CSI-RS, the scheduled entity may measure the channel quality across layers and resource blocks and feedback channel state information, including for example, a channel quality indicator (CQI), precoding matrix index (PMI) and the rank indicator (RI), to the scheduling entity for use in updating the rank and assigning resource elements for future downlink transmissions.

In some examples, the scheduled entity or UE may measure the channel quality (e.g., SINR) over the entire downlink bandwidth and provide a wideband CQI to the scheduling entity. In other examples, the scheduled entity or UE may measure the channel quality over only the sub-bands for which the scheduled entity has scheduled data and provide respective CQI values for each scheduled sub-band to the scheduling entity. The CQI may include, for example, a modulation and coding scheme (MCS) index that indicates the highest modulation and code rate at which the block error rate (BLER) of the channel being analyzed does not exceed 10%. In some examples, the sub-band CQI values may be determined by combining the channel quality measurements (SINR) across layers (e.g., traffic streams in MIMO systems) and resource blocks to derive a total MCS index, which may then be normalized by the number of layers, with the resulting MCS index being fed back to the scheduling entity.

In the simplest case, as shown in FIG. 4, a rank-2 spatial multiplexing transmission on a 2×2 MIMO antenna configuration will transmit one traffic stream from each transmit antenna 404. Each traffic stream reaches each receive antenna 408 along a different signal path 410. The receiver 406 may then reconstruct the traffic streams using the received signals from each receive antenna 408.

In the detailed description that follows, various aspects of a radio access network will be described with reference to a New Radio (NR) wireless system supporting MU-MIMO and/or massive MIMO (e.g., supporting at least 32 transmit antennas or up to hundreds of transmit antennas at the scheduling entity). In various aspects of the disclosure, each scheduled entity may be assigned one or more transmit antennas (also referred to herein as ports) from which to receive MIMO streams from the scheduling entity. The number of ports assigned to a particular scheduled entity may depend, for example, on the maximum rank supported by the scheduled entity. Typically, the maximum rank supported by a scheduled entity is four or eight.

To efficiently allocate ports to the scheduled entities, the ports may be divided into sets of two or more ports, and each scheduled entity may be associated with a particular set of two or more ports. A scheduled entity may then receive CSI-RS pilots transmitted from the scheduling entity on the associated set of ports and estimate the channel state information (CQI, RI, and PMI values) from the received CSI-RS pilots.

The scheduling entity and scheduled entity may further support different types of reports or measurements, such as beam-sweeping measurements or tracking measurements, to be performed utilizing the CSI-RS pilots. In addition, different report/measurement configurations may be supported by the scheduling entity and scheduled entity. For example, self-contained CSI (e.g., CSI is transmitted back to the scheduling entity in the same slot as the CSI-RS is transmitted from the scheduling entity) or non-self-contained CSI (e.g., CSI is transmitted back to the scheduling entity in a later slot than the slot in which the CSI-RS is transmitted from the scheduling entity) may be supported. To distinguish between the different report/measurement types and measurement configurations, CSI-RS pilots may be mapped to specific resource elements (REs) and ports for each of the report/measurement types and report/measurement configurations.

Figure 5:
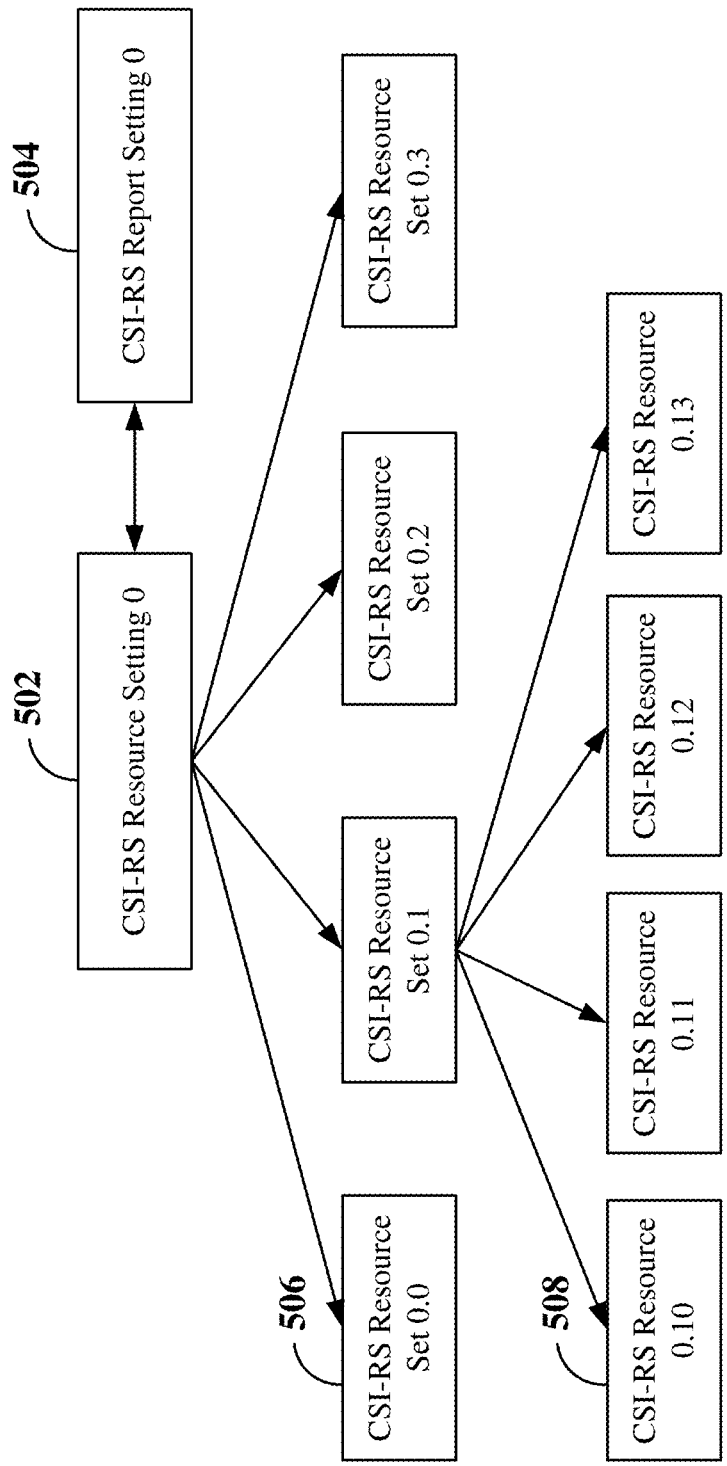
FIG. 5 is a diagram illustrating an example of CSI-RS resource mapping according to some aspects of the present disclosure.

FIG. 5 illustrates an exemplary CSI-RS resource mapping to support different report/measurement types, report/measurement configurations, and sets of ports. The CSI-RS resource mapping includes CSI-RS resource settings 502, CSI-RS resource sets 506, and CSI-RS resources 508. Each CSI-RS resource setting 502 includes one or more CSI-RS resource sets 506, and each CSI-RS resource set 506 includes one or more CSI-RS resources 508. In the example shown in FIG. 5, a single CSI-RS resource setting CSI-RS resource setting 0) is illustrated. However, it should be understood that any suitable number of CSI-RS resource settings 502 may be supported.

Each CSI-RS resource setting 502 corresponds to a particular CSI-RS report setting 504. The CSI-RS report setting 504 indicates the specific type of report and periodicity of the report associated with the CSI-RS resource setting 502. For example, the CSI-RS report setting 504 may indicate that a CSI report, a beam-sweeping report, a time-frequency tracking report, or other suitable report should be generated. In addition, the CSI-RS report setting 504 may indicate that the report should be generated periodically, aperiodically, or semi-statically. Each CSI-RS report setting 504 therefore indicates a particular measurement setting for the CSI-RS resource setting 502. For example, if the CSI-RS report setting 504 indicates that a CSI report should be generated semi-statically, the CSI-RS resource setting 502 indicates that CSI measurements should be performed semi-statically by the scheduled entity utilizing the CSI-RS pilots.

Each CSI-RS resource setting 502 may include one or more CSI-RS resource sets 506, each indicating a particular configuration of the report/measurement associated with the CSI-RS resource setting 502. For example, one of the CSI-RS resource sets may be associated with self-contained CSI, while another CSI-RS resource set may be associated with non-self-contained CSI. As another example, one of the CSI-RS resource sets may be associated with a particular set of ports, while another CSI-RS resource set is associated with a particular time frequency resource location within a slot. In the example shown in FIG. 5, CSI-RS resource setting 0 includes four CSI-RS resource sets (CSI-RS resource set 0.0, CSI-RS resource set 0.1, CSI-RS resource set 0.2, and CSI-RS resource set 0.3). In some examples, the CSI-RS resource setting 502 and CSI-RS resource set 506 selected for a particular scheduled entity may be signaled semi-statically via radio resource control (RRC) signaling.

Each CSI-RS resource set 506 may include one or more CSI-RS resources 508, each indicating the particular resource elements (REs), the particular ports (e.g., set of ports) on which CSI-RS pilots may be measured by the scheduled entity, and the multiplexing options. For example, the CSI-RS resources 508 may indicate an RE on which a CSI-RS pilot transmitted from a particular port may be measured. In the example shown in FIG. 5, CSI-RS resource set 0.1 includes four CSI-RS resources (CSI-RS resource 0.10, CSI-RS resource 0.11, CSI-RS resource 0.12, and CSI-RS resource 0.13).

Different CSI-RS resources 508 may be available for each of the CSI-RS resource sets 506 to enable CSI-RS pilots to be transmitted in different locations within a slot and/or to be transmitted with different densities in a slot. In addition, different CSI-RS resources 508 may be available to enable CSI-RS pilots to be transmitted from one port or set of ports at the beginning of a slot and another port or set of ports at the end of a slot. The difference CSI-RS resources 508 assigned to a particular scheduled entity may enable the scheduled entity to report back a CSI-RS resource indication (CRI) of which CSI-RS resource set 506 and/or CSI-RS resources 508 would lead to the best performance. In some examples, a particular scheduled entity may be assigned one or more of the CSI-RS resources 508 within a slot. The CSI-RS resource(s) 508 assigned to a particular scheduled entity may be signaled, for example, via downlink control information (DCI) within the PDCCH.

In some examples, the scheduled entity may be assigned each of the ports within the set of ports to receive the CSI-RS to estimate the channel so that the scheduled entity may receive MIMO traffic streams from the scheduling entity on those ports at a later time. However, in other examples, the scheduled entity may only be assigned a portion of the ports within the set of ports. In this example, the scheduled entity may not only estimate the channel from the received CSI-RS on the assigned ports, but also the non-zero-power (NZP) interference from the received CSI-RS on the non-assigned ports. In some examples, the NZP interference may be estimated by subtracting the channel estimation from the total received CSI-RS pilot signal. The non-assigned ports may be assigned to another scheduled entity or may be unassigned.

Figure 6:
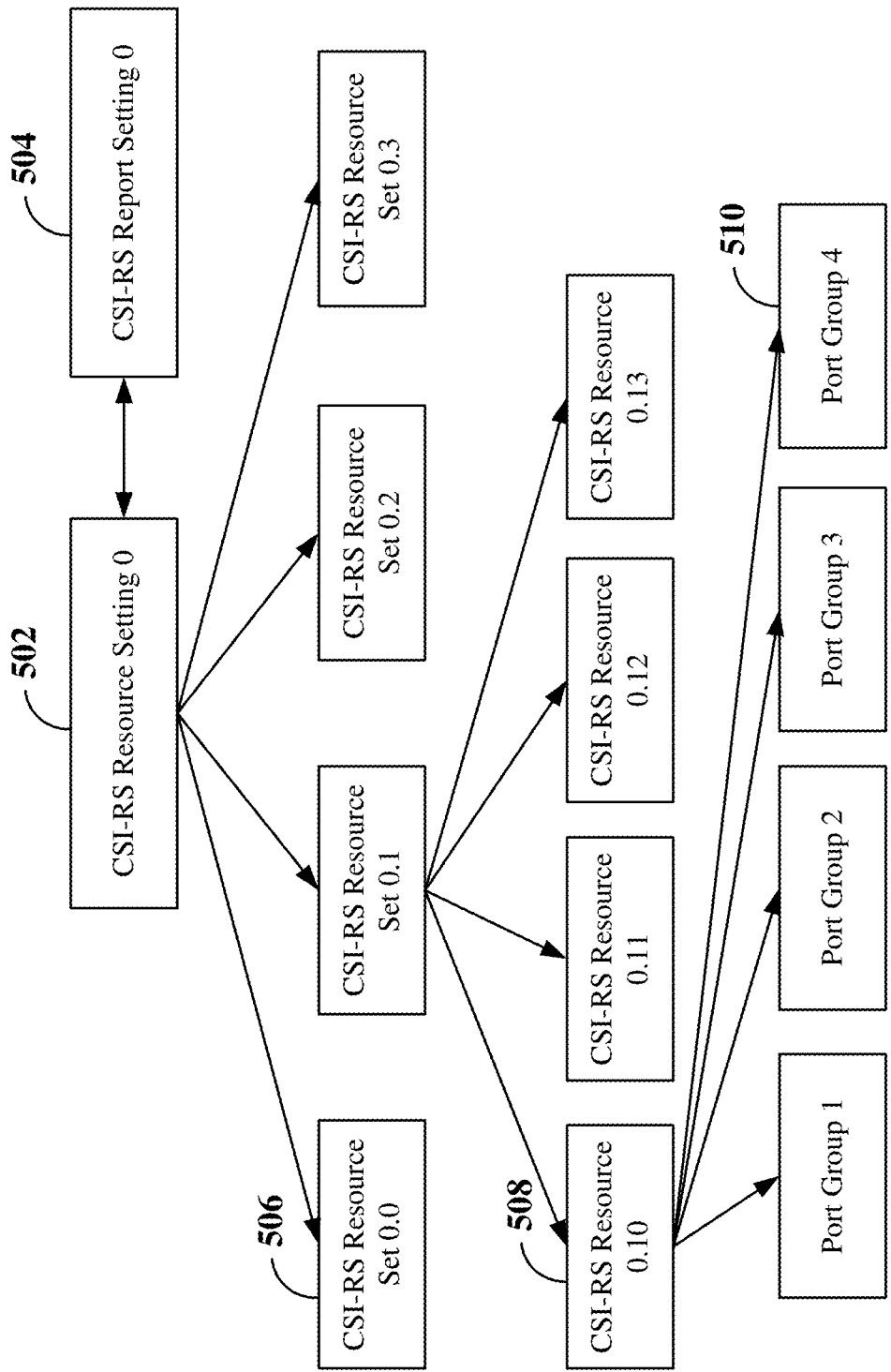
FIG. 6 is a diagram illustrating an example of CSI-RS resource mapping with port group indication according to some aspects of the present disclosure.

In various aspects of the present disclosure, to indicate which ports within a set of ports are assigned to a particular scheduled entity for MIMO traffic transmissions, and therefore, which ports may be utilized for channel estimation, port groups may be defined and signaled to the scheduled entity. FIG. 6 illustrates an example of a CSI-RS resource mapping with port group indication. Thus, each CSI-RS resource 508 may include one or more Port groups 510, each indicating a specific group of one or more ports within the set of ports associated with the CSI-RS resource 508 on which the scheduled entity should measure the channel. The other ports within the set of ports that are not included in the port group may be assumed by the scheduled entity to be utilized for interference measurement and not for channel measurement. It should be noted that the interference measurement on the other ports may still be considered an estimation of the channel of the other ports. However, the measured channel of the other ports will not be used for user data traffic transmissions, but rather will merely interfere with user data traffic transmissions to the scheduled entity on the ports in the port group. In some examples, the assigned ports may also be used for interference measurements. For example, the scheduled entity may measure the inter-cell interference. In the example shown in FIG. 6, CSI-RS resource 0.10 includes four port groups (Port group 1, Port group 2, Port group 3, and Port group 4).

For example, assume that a CSI-RS resource 508 (e.g., CSI-RS resource 0.10) has X ports. Each Port group 510 may include K ports, where K≤X. Thus, each Port group 510 splits the ports into two pools, where K of the X ports are used for channel measurement and the remaining X-K ports are used for interference measurement. It should be noted that the X-K ports may not actually be utilized for transmission to other scheduled entities. In some examples, the X-K ports may be empty. In this example, the scheduled entity may blindly estimate the interference or the interfering channels to determine whether there are transmissions to other scheduled entities on the X-K ports.

The Port groups 510 may be configured, for example, semi-statically. For example, each of the Port groups 510 within each of the CSI-RS resources 508 may be signaled via RRC signaling. A specific Port group 510 selected for a scheduled entity may be signaled, for example, via downlink control information (DCI) within the PDCCH. In some examples, the specific Port group selected for a scheduled entity may be signaled within the UE-specific portion of the DCI. This may be helpful in scenarios intra-cell interference with MU-MIMO, where each scheduled entities port pairing may change dynamically each slot. The scheduling entity may then dynamically signal to each UE via the UE-specific DCI which ports should be utilized in the configured CSI-RS resource 508 for channel and interference measurement.

In some examples, in order to minimize the DCI overhead, only a subset of the Port group combinations may be allowed. For example, the Port groups 510 may be configured such that only consecutive port numbers may be assigned to each Port group. In addition, the Port groups 510 may be configured to have a nested property such that the particular ports that may be included in a Port group 510 for a particular number of ports are restricted based on the port group assignments for higher numbers of ports. Thus, the port groups allowed for a first number of ports are a subset of the port groups allowed for a second number of ports greater than the first number of ports.

For semi-persistent CSI-RS resources, the specific CSI-RS resource selected for a particular scheduled entity may be signaled, for example, via RRC signaling or MAC CE (MAC layer control element) signaling, which may carry more information than DCI. Thus, for semi-persistent scheduling, more port combinations (Port groups) may be allowed for each CSI-RS resource. The port group options for semi-persistent scheduling may follow the consecutive and/or nested rules described above or may include any combination of port groups. In some examples, MAC CE signaling may further be utilized with DCI to configure a subset of the Port groups 510 through MAC CE, and then utilize DCI to signal the specific Port group within the subset of Port groups.

Figure 7:
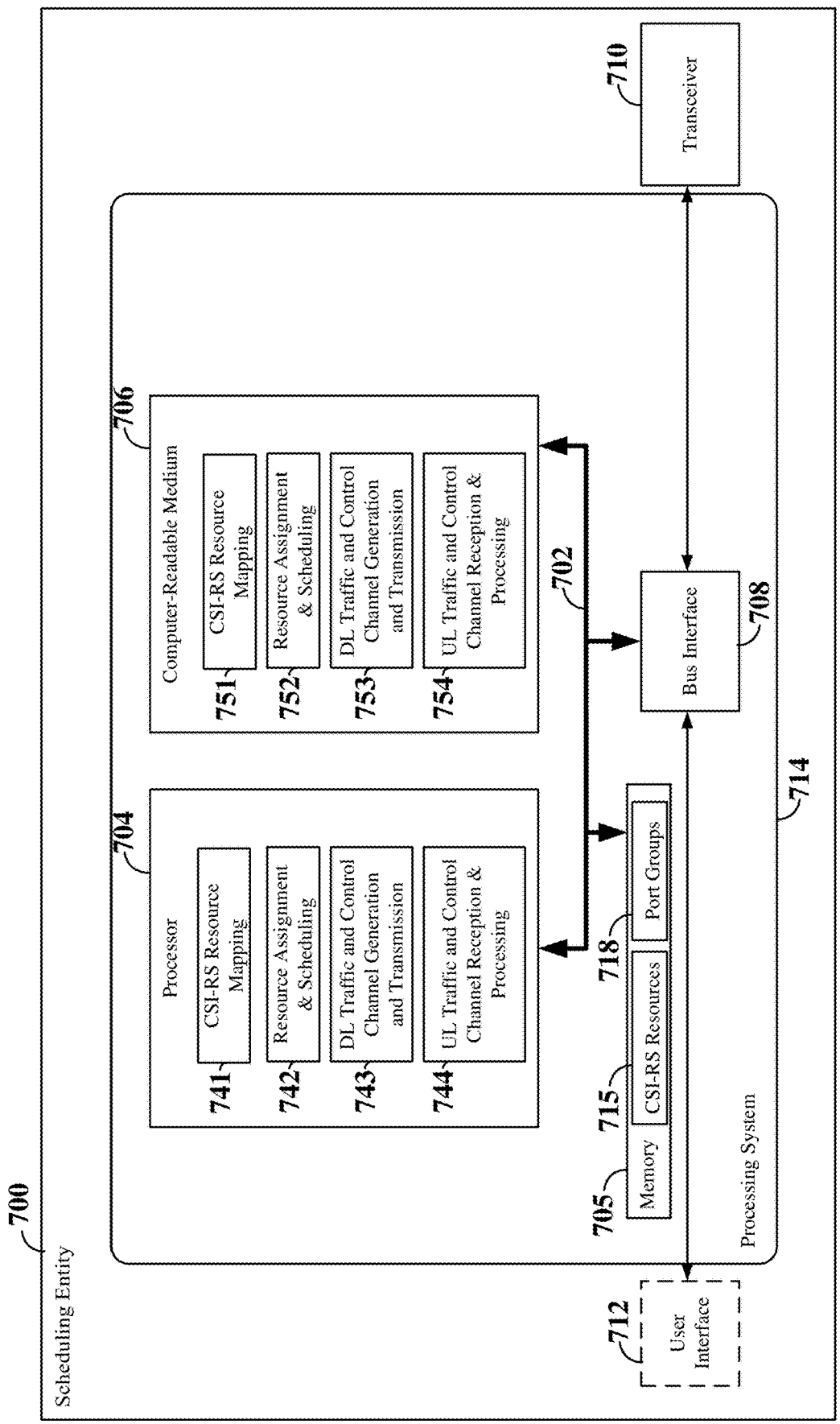
FIG. 7 is a block diagram illustrating an example of a hardware implementation for a scheduling entity employing a processing system according to some aspects of the present disclosure.

FIG. 7 is a conceptual diagram illustrating an example of a hardware implementation for an exemplary scheduling entity 700 employing a processing system 714. For example, the scheduling entity 700 may be a user equipment (UE) as illustrated in any one or more of FIGS. 1 and 2. In another example, the scheduling entity 700 may be a base station as illustrated in any one or more of FIGS. 1 and 2. For example, the scheduling entity 700 may be a next generation (5G) scheduling entity serving a MU-MIMO or massive MIMO cell.

The scheduling entity 700 may be implemented with a processing system 714 that includes one or more processors 704. Examples of processors 704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 700 may be configured to perform any one or more of the functions described herein. That is, the processor 704, as utilized in a scheduling entity 700, may be used to implement any one or more of the processes described below. The processor 704 may in some instances be implemented via a baseband or modem chip and in other implementations, the processor 704 may itself comprise a number of devices distinct and different from a baseband or modem chip (e.g., in such scenarios is may work in concert to achieve embodiments discussed herein). And as mentioned above, various hardware arrangements and components outside of a baseband modem processor can be used in implementations, including RF-chains, power amplifiers, modulators, buffers, interleavers, adders/summers etc.

In this example, the processing system 714 may be implemented with a bus architecture, represented generally by the bus 702. The bus 702 may include any number of interconnecting buses and bridges depending on the specific application of the processing system 714 and the overall design constraints. The bus 702 communicatively couples together various circuits including one or more processors (represented generally by the processor 704), a memory 705, and computer-readable media (represented generally by the computer-readable medium 706). The bus 702 may also link various other circuits such as timing sources, peripherals, voltage regulators, and power management circuits, which are well known in the art, and therefore, will not be described any further. A bus interface 708 provides an interface between the bus 702 and a transceiver 710. The transceiver 710 provides a means for communicating with various other apparatus over a transmission medium (e.g., air interface). Depending upon the nature of the apparatus, a user interface 712 (e.g., keypad, display, speaker, microphone, joystick) may also be provided.

The processor 704 is responsible for managing the bus 702 and general processing, including the execution of software stored on the computer-readable medium 706. The software, when executed by the processor 704, causes the processing system 714 to perform the various functions described below for any particular apparatus. The computer-readable medium 706 and the memory 705 may also be used for storing data that is manipulated by the processor 704 when executing software.

One or more processors 704 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 706.

The computer-readable medium 706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 706 may reside in the processing system 714, external to the processing system 714, or distributed across multiple entities including the processing system 714. The computer-readable medium 706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 704 may include circuitry configured for various functions. For example, the processor 704 may include channel state information reference signal (CSI-RS) resource mapping circuitry 741, configured to configure one or more CSI-RS resource settings, one or more CSI-RS sets within each of the CSI-RS resource settings, and one or more CSI-RS resources 715 within each of the CSI-RS resource sets. Each CSI-RS resource setting may be associated with a respective report setting indicating a type and periodicity of a report to be generated based on a measurement of the CSI-RS. Each CSI-RS resource set within a CSI-RS resource setting may indicate a particular configuration of the report or measurement associated with the CSI-RS resource setting. Each CSI-RS resource 715 within a CSI-RS resource set may identify a set of one or more resource elements (REs) on which to transmit the CSI-RS and a set of one or more ports from which to transmit the CSI-RS.

In various aspects of the disclosure, the CSI-RS resource mapping circuitry 741 may further configure a set of one or more port groups 718 within each of the CSI-RS resources 715. Each of the port groups 718 within a CSI-RS resource 715 identifies a group of ports within the respective set of ports of the CSI-RS resource 715 that is associated with a channel (e.g., may be assigned to a scheduled entity to form a channel between the scheduling entity 700 and the scheduled entity). For example, the scheduled entity may utilize the ports indicated by the port group 718 to measure channel state information (CSI) for the channel and may utilize the other ports within the set of ports that are outside of the port group 718 to measure the non-zero-power (NZP) interference.

In some examples, each of the port groups 718 for each of the CSI-RS resources 715 may include consecutive numbered ports. In some examples, for one or more of the CSI-RS resources 715, the set of port groups 718 may include nested port groups based on the number of ports included within each port group. For example, a first port group within a CSI-RS resource may include a first group of ports and a second port group within the CSI-RS resource may include a second group of ports. In addition, the second port group may include a fewer number of ports than the first port group. The first and second port groups may be considered nested when the first port group includes all of the same ports as the second port group, plus one or more additional ports. Thus, the second port group is a subset of the first port group.

In some examples, the CSI-RS resource mapping circuitry 741 may further be configured to identify port group subsets within each set of port groups 718 for each CSI-RS resource 715 and to further identify the port groups 718 within each of the port group subsets. The CSI-RS resource mapping circuitry 741 may operate in coordination with CSI-RS resource mapping software 751.

The processor 704 may further include resource assignment and scheduling circuitry 742, configured to generate, schedule, and modify a resource assignment or grant of time-frequency resources. For example, the resource assignment and scheduling circuitry 742 may schedule time-frequency resources within a plurality of sub-bands of one or more time division duplex (TDD) and/or frequency division duplex (FDD) subframes or slots to carry user data traffic and/or control information to and/or from multiple scheduled entities.

In various aspects of the present disclosure, the resource assignment and scheduling circuitry 742 may further be configured to select a CSI-RS resource setting, a CSI-RS resource set under the selected CSI-RS resource setting, a CSI-RS resource 715 under the selected CSI-RS resource set, and a port group 718 (or a port group subset and a port group) under the selected CSI-RS resource 715 for a scheduled entity, and schedule a CSI-Reference Signal (CSI-RS) to be transmitted to the scheduled entity on the set of resource elements (REs) and set of ports associated with the selected CSI-RS resource. The CSI-RS may include separate Cell-specific Reference Signal (C-RS) sequences for each layer (traffic stream) assigned to the scheduled entity to enable the scheduled entity to perform multi-layer channel estimation and return the calculated CSI based on the multi-layer channel estimation. In some examples, the resource assignment and scheduling circuitry 742 may select the port group for a particular scheduled entity based on the number of ports supported by the scheduled entity.

The resource assignment and scheduling circuitry 742 may further receive channel state information (CSI) from the scheduled entity measured utilizing the CSI-RS and assign a rank to the scheduled entity based on the CSI. In some examples, the CSI received from the scheduled entity may include a channel quality indicator (CQI), precoding matrix index (PMI) and rank indicator (RI). The CQI may include a wideband CQI value and/or multiple sub-band CQI values, each including modulation and coding scheme (MCS) information (e.g., an MCS index).

The resource assignment and scheduling circuitry 742 may select a modulation and coding scheme (MCS) and precoding matrix for downlink transmissions to each scheduled entity based on the respective CQI and PMI and assign a rank to each scheduled entity based on the respective RI (and other factors, such as the number of available resources). Using the MCS, precoding matrix and rank, the resource assignment and scheduling circuitry 742 may schedule time-frequency resources (e.g., resource elements) within one or more sub-bands of a subframe or slot for one or more of the scheduled entities. In some examples, the resource assignment and scheduling circuitry 742 may schedule a number of traffic streams (corresponding to the rank) to be spatially multiplexed to a scheduled entity in one or more sub-bands of a subframe or slot. The resource assignment and scheduling circuitry 742 may operate in coordination with resource assignment and scheduling software 752.

The processor 704 may further include downlink (DL) traffic and control channel generation and transmission circuitry 743, configured to generate and transmit downlink traffic and control channels within downlink subframes or slots. The DL traffic and control channel generation and transmission circuitry 743 may operate in coordination with the resource assignment and scheduling circuitry 742 to place the DL user data traffic and/or control information onto a time division duplex (TDD) or frequency division duplex (FDD) carrier by including the DL user data traffic and/or control information within one or more sub-bands of subframes or slots in accordance with the resources assigned to the DL user data traffic and/or control information. For example, the DL traffic and control channel generation and transmission circuitry 743 may generate and transmit one or more traffic streams within one or more sub-bands of a subframe or slot to a scheduled entity based on the downlink resources assigned to the scheduled entity in each sub-band of the subframe or slot.

In various aspects of the present disclosure, the DL traffic and control channel generation and transmission circuitry 743 may further generate and transmit a CSI-RS to the scheduled entity on the set of resource elements and set of ports indicated by the CSI-RS resource 715 selected by the resource assignment and scheduling circuitry 742. The DL traffic and control channel generation and transmission circuitry 743 may further be configured to generate and transmit an indication of the selected CSI-RS resource setting and CSI-RS resource set for a scheduled entity within a radio resource control (RRC) message. In addition, the DL traffic and control channel generation and transmission circuitry 743 may further be configured to generate and transmit an indication of the selected CSI-RS resource 715 and port group 718 for a scheduled entity within downlink control information (DCI) of a physical downlink control channel (PDCCH) (or Enhanced PDCCH (EPDCCH)).

In some examples, for semi-persistently scheduled CSI-RS, the DL traffic and control channel generation and transmission circuitry 743 may be configured to transmit the indication of the selected CSI-RS resource and selected port group for a scheduled entity within an RRC message or a media access control (MAC) control element (CE). In some examples, the DL traffic and control channel generation and transmission circuitry 743 may be configured to transmit a port group subset indication to the scheduled entity within a MAC CE and to further transmit the indication of the port group within the port group subset to the scheduled entity within the DCI of the PDCCH.

In some examples, the DL traffic and control channel generation and transmission circuitry 743 may further be configured to transmit the port group options (e.g., the set of available port groups) for each CSI-RS resource to the scheduled entity within an RRC message. The DL traffic and control channel generation and transmission circuitry 743 may further operate in coordination with DL traffic and control channel generation and transmission software 753.

The processor 704 may further include uplink (UL) traffic and control channel reception and processing circuitry 744, configured to receive and process uplink control channels and uplink traffic channels from one or more scheduled entities. For example, the UL traffic and control channel reception and processing circuitry 744 may be configured to receive the CSI (e.g., CQI/PMI/RI) from a scheduled entity and provide the CSI to the resource assignment and scheduling circuitry 742 to select/adjust an MCS, precoding matrix and/or rank and schedule a next downlink transmission (e.g., downlink frame, subframe, and/or slot) to the scheduled entity based on the selected/adjusted MCS, precoding matrix and rank.

The UL traffic and control channel reception and processing circuitry 744 may further be configured to receive scheduling requests from one or more scheduled entities, the scheduling requests being configured to request a grant of time-frequency resources for uplink user data traffic transmissions. In other examples, the UL traffic and control channel reception and processing circuitry 744 may be configured to receive and process acknowledgement information (e.g., acknowledged/not acknowledged packets) from one or more scheduled entities.

In general, the UL traffic and control channel reception and processing circuitry 744 may operate in coordination with the resource assignment and scheduling circuitry 742 to schedule UL user data traffic transmissions, DL user data traffic transmissions and/or DL user data traffic retransmissions in accordance with the received UL control channel information. The UL traffic and control channel reception and processing circuitry 744 may further operate in coordination with UL traffic and control channel reception and processing software 754.

Figure 8:
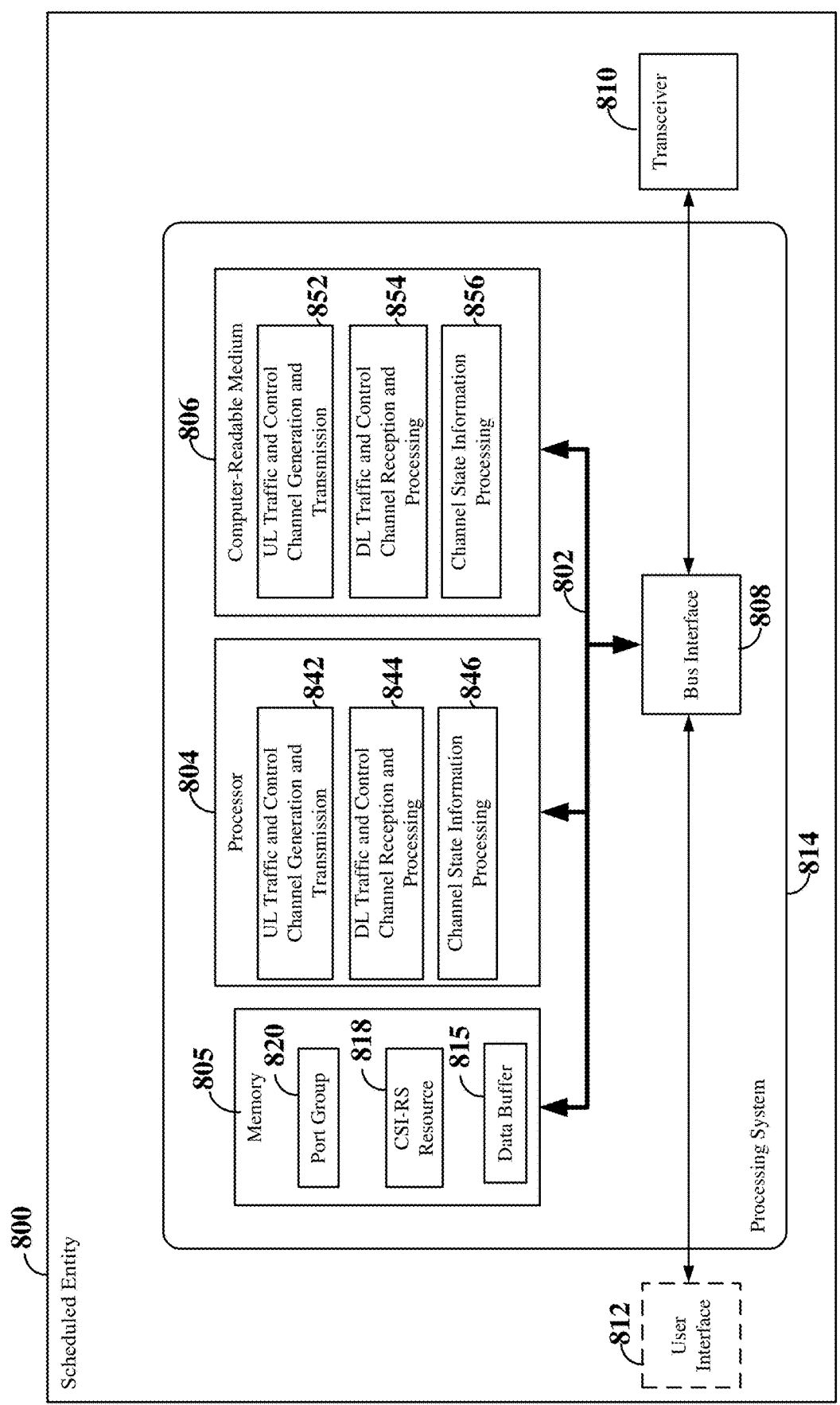
FIG. 8 is a block diagram illustrating an example of a hardware implementation for a scheduled entity employing a processing system according to some aspects of the present disclosure.

FIG. 8 is a conceptual diagram illustrating an example of a hardware implementation for an exemplary scheduled entity 800 employing a processing system 814. In accordance with various aspects of the disclosure, an element, or any portion of an element, or any combination of elements may be implemented with a processing system 814 that includes one or more processors 804. For example, the scheduled entity 800 may be a user equipment (UE) as illustrated in any one or more of FIGS. 1 and 2.

The processing system 814 may be substantially the same as the processing system 714 illustrated in FIG. 7, including a bus interface 808, a bus 802, memory 805, a processor 804, and a computer-readable medium 806. Furthermore, the scheduled entity 800 may include a user interface 812 and a transceiver 810 substantially similar to those described above in FIG. 7. That is, the processor 804, as utilized in a scheduled entity 800, may be used to implement any one or more of the processes described below.

In some aspects of the disclosure, the processor 804 may include uplink (UL) traffic and control channel generation and transmission circuitry 842, configured to generate and transmit uplink user data traffic on an UL traffic channel, and to generate and transmit uplink control/feedback/acknowledgement information on an UL control channel. For example, the UL traffic and control channel generation and transmission circuitry 742 may be configured to generate and transmit an uplink control channel (e.g., a Physical Uplink Control Channel (PUCCH)) including channel state information (CSI), such as channel quality information (CQI), precoding matrix index (PMI) and a rank indicator (RI). The UL traffic and control channel generation and transmission circuitry 842 may operate in coordination with UL traffic and control channel generation and transmission software 852.

The processor 804 may further include downlink (DL) traffic and control channel reception and processing circuitry 844, configured for receiving and processing downlink user data traffic on a traffic channel, and to receive and process control information on one or more downlink control channels. For example, the DL traffic and control channel reception and processing circuitry 844 may be configured to receive downlink control information (DCI) (e.g., within a PDCCH or EPDCCH) or a RRC message including an indication of a particular CSI-RS resource 818 identifying the resource elements and ports on which a CSI-RS may be received, and a port group 820 identifying the ports within the CSI-RS on which to perform channel estimation. The identified CSI-RS resource 818 and port group 820 may be stored, for example, in memory 805. The DL traffic and control channel reception and processing circuitry 844 may then use the CSI-RS resource indication to receive a CSI-RS via the transceiver 710. In some examples, received downlink user data traffic and/or control information may be temporarily stored in a data buffer 815 within memory 805. The DL traffic and control channel reception and processing circuitry 844 may operate in coordination with DL traffic and control channel reception and processing software 854.

The processor 804 may further include channel state information (CSI) processing circuitry 846, configured to receive the CSI-RS resource and port group indication from the DL traffic and control channel reception and processing circuitry 844, to receive the CSI-RS from the DL traffic and control channel reception and processing circuitry 844 via the transceiver 810, and to calculate the CSI based on the port group information. For example, the CSI processing circuitry 846 may utilize the port group indication to measure the CSI on the indicated ports. The CSI processing circuitry 846 may further be configured to measure the NZP interference on ports included in the CSI-RS resource, but outside of the port group.

In some examples, the CSI-RS may include separate Cell-specific Reference Signal (C-RS) sequences for each layer (traffic stream) assigned to the scheduled entity. Therefore, from the CSI-RS, the CSI processing circuitry 846 may perform a multi-layer channel estimation and calculate the CSI (e.g., CQI, PMI and RI) based on the multi-layer channel estimation. The CSI processing circuitry 846 may operate in coordination with CSI processing software 856.

FIG. 9 is a diagram illustrating an example of port groups for a CSI-RS resource with six ports according to some aspects of the present disclosure. In the example shown in FIG. 9, each port is sequentially represented by a bit in a bit field, with the first port corresponding to the first location in the bit field and the sixth port corresponding to the sixth location in the bit field. Here, a "1" signifies that the port is assigned to a particular UE (scheduled entity), and a "0" signifies that the port is not assigned to that particular UE.

In the example shown in FIG. 9, out of the possible bit field values, only certain values may be allowed to minimize the DCI overhead. In particular, only a subset of the bit field values for each number of ports may be allowed, except when only a single port is assigned. In that case, any of the ports (e.g., port 1-port 6) may be assigned to the UE. In some examples, as shown in FIG. 9, only consecutive numbered ports may be assigned to a UE. For example, if two ports are assigned to the UE, the two ports must be consecutive (e.g., the first and second ports or the fifth and sixth ports). In addition, as shown in FIG. 9, the port groups may be nested. For example, the ports included in a port group having five ports necessarily includes all of the ports included a port group having four ports. In the example shown in FIG. 9, the first port group having four ports includes ports 1-4, which is a nested port group of the first port group having five ports, which includes ports 1-5. Thus, the first port group having four ports is a subset of the first port group having five ports.

Thus, out of the possible bit field values (port group options), the example shown in FIG. 9 only allows 15 port group options: 6 options for one port assigned to the UE, 2 options for two ports assigned to the UE, 2 options for three ports assigned to the UE, 2 options for four ports assigned to the UE, 2 options for five ports assigned to the UE, and 1 option for six ports assigned to the UE. To convey which of the 15 port group options is selected for a particular UE would then require a 4-bit field in the DCI. It should be noted that if the UE does not support more than four ports, the five port and six port options may not be needed.

As described above, to reduce the DCI overhead further, port group subsets may be configured and signaled within a MAC CE, and the specific port group within the port group subset selected for a UE may then be signaled in the DCI. For example, assume that a port group subset includes the following port group options from FIG. 6: {100000, 110000, 111000, 111100}. To signal which of the port groups within this port group subset is assigned to a UE only requires a 2-bit field in the DCI.

FIG. 10 is a diagram illustrating an example of port groups for a CSI-RS resource with twelve ports according to some aspects of the present disclosure. By including twelve orthogonal ports in a CSI-RS resource, a UE may measure both the channel on assigned ports and interference on unassigned ports. In particular, out of the twelve ports, up to the maximum rank (e.g., 4 or 8 ports depending on the UE capability) may be utilized to measure the channel and the remaining ports may be utilized to measure the interference. Thus, since a maximum of eight ports may be assigned to a UE, port groups including over eight ports are not considered.

In the example shown in FIG. 10, if only one port is assigned to the UE, any of the twelve ports may be assigned, thus providing 12 port group options for a single port. If only two ports are assigned to the UE, there are 6 port group options, each including consecutive numbered ports. If three ports are assigned to the UE, FIG. 10 provides two different scenarios. In one scenario, two port group options may be allowed for three ports, whereas in another scenario, four port group options may be allowed for three ports. In examples where two port group options may be allowed, the port group options may include the end port group options (111000000000, 000000000111). In examples where all four port group options may be allowed, the middle two port group options (111000000000, 000000000111) are not nested port group options (e.g., the middle two port group options do not represent a subset of any port group options allowed with a higher number of ports).

Similarly, for four ports, either two port group options or three port group options may be allowed, where the third (middle) port group option (000011110000) is not nested. In examples where two port group options may be allowed, the port group options may include the end port group options (111100000000, 000000001111).

Two port group options are allowed for each of five, six, seven, or eight ports, bringing the total number of port group options up to 33 port group options. However, to keep the DCI to a 5-bit field, a maximum of 32 port group options may be allowed. Thus, in some examples, if four port group options are allowed for three ports, only two port group options may be allowed for four ports. Similarly, in some examples, if three port group options are allowed for four ports, only two port group options may be allowed for three ports.

FIG. 11 is a diagram illustrating an example of port groups for a CSI-RS resource with eight ports according to some aspects of the present disclosure. The port group options shown in FIG. 11 are both consecutively numbered and nested. Again, if only one port is assigned to the UE, any of the eight ports may be assigned, thus providing 8 port group options for a single port. If only two ports are assigned to the UE, there are 4 port group options, each including consecutive numbered ports. If three ports are assigned to the UE, FIG. 11 provides two port options. Similarly, if four, five, six, or seven ports are assigned to the UE, there are also two port options for each. In addition, if eight ports are assigned to the UE, there is only one port option, bringing the total number of port options to 23 options, thus requiring a 5-bit field in the DCI.

Figure 12:
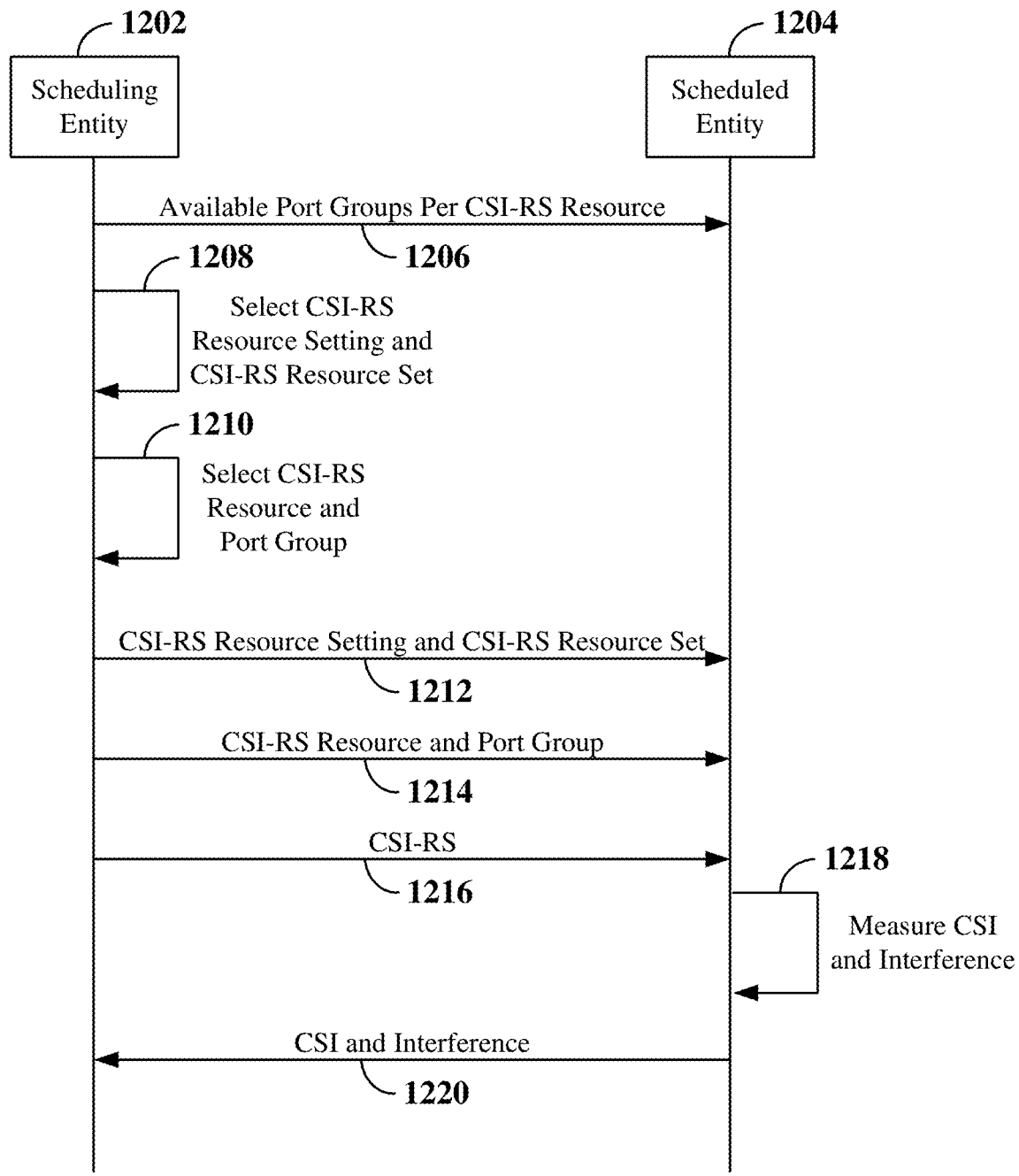
FIG. 12 is a diagram illustrating exemplary CSI-RS signaling between a scheduling entity and a scheduled entity.

FIG. 12 is a diagram illustrating exemplary CSI-RS signaling between a scheduling entity 1202 and a scheduled entity 1204 according to sonic aspects of the present disclosure. The scheduling entity 1202 may be a UE or a base station as illustrated in any one or more of FIGS. 1, 2, and 7. The scheduled entity 1204 may be a UE as illustrated in any one or more of FIGS. 1, 2, and 8. In the example shown in FIG. 12, at 1206, the scheduling entity 1202 may generate and transmit a respective set of available port groups for each CSI-RS resource to the scheduled entity 1204. The available port groups for each CSI-RS resource may be transmitted to the scheduled entity 1204 within, for example, an RRC message.

At 1208, the scheduling entity 1202 may select a CSI-RS resource setting and a CSI-RS resource set for the scheduled entity 1204. Each CSI-RS resource setting may be associated with a respective report setting indicating a type and periodicity of a report to be generated based on a measurement of the CSI-RS. Each CSI-RS resource set within a CSI-RS resource setting may indicate a particular configuration of the report or measurement associated with the CSI-RS resource setting. At 1210, the scheduling entity 1202 may further select a CSI-RS resource and port group for the scheduled entity 1204. Each CSI-RS resource within a CSI-RS resource set may identify a set of one or more resource elements (REs) on which to transmit the CSI-RS and a set of one or more ports from which to transmit the CSI-RS.

At 1212, the scheduling entity 1202 may generate and transmit an indication of the selected CSI-RS resource setting and CSI-RS resource set for the scheduled entity 1204 to the scheduled entity 1204 within, for example, an RRC message. In addition, at 1214, the scheduling entity 1202 may generate and transmit an indication of the selected CSI-RS resource identifying the resource elements and ports on which a CSI-RS may be received, and the selected port group identifying the ports within the CSI-RS on which to perform channel estimation to the scheduled entity 1204. In some examples, the indication of the selected CSI-RS resource and selected port group may be transmitted within DCI of a PDCCH. For semi-persistently scheduled CSI-RS, the indication of the selected CSI-RS resource and selected port group may be transmitted within an RRC message or a MAC CE. In some examples, the scheduling entity 1202 may generate and transmit a port group subset indication to the scheduled entity 1204 within a MAC CE and may further transmit the indication of the selected port group within the port group subset to the scheduled entity 1204 within the DCI of the PDCCH.

At 1216, the scheduling entity 1202 may generate and transmit a CSI-RS to the scheduled entity 1204 on the set of resource elements and set of ports indicated by the CSI-RS resource. At 1218, the scheduled entity 1204 may measure the CSI and the NZP interference based on the port group information. For example, the scheduled entity 1204 may utilize the port group indication to measure the CSI on the indicated ports. The scheduled entity 1204 may further measure the NZP interference on ports included in the CSI-RS resource, but outside of the selected port group. At 1220, the scheduled entity 1204 may transmit the CSI and interference measurement to the scheduling entity 1202.

Figure 13:
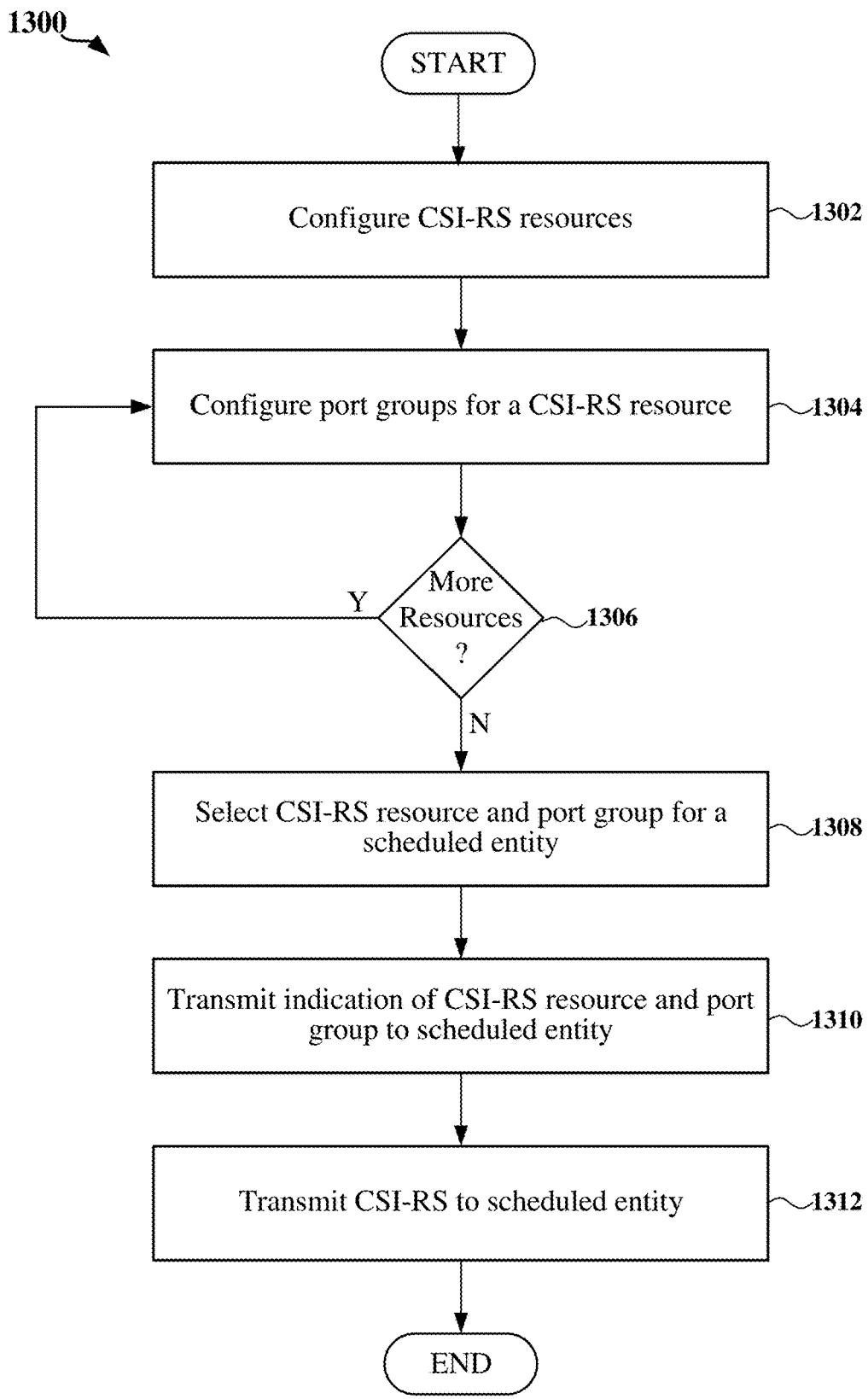
FIG. 13 is a flow chart of a method of configuring port groups for CSI-RS resources in a wireless communication network according to some aspects of the present disclosure.

FIG. 13 is a flow chart illustrating an exemplary process 1300 for configuring port groups for channel state information reference signal (CSI-RS) resources in a wireless communication network according to some aspects of the present disclosure. As described below, some or all illustrated features may be omitted in a particular implementation within the scope of the present disclosure, and some illustrated features may not be required for implementation of all embodiments. In some examples, the process 1300 may be carried out by the scheduling entity 700 illustrated in FIG. 7. In some examples, the process 1300 may be carried out by any suitable apparatus or means for carrying out the functions or algorithm described below.

At block 1302, the scheduling entity may configure a plurality of channel state information reference signal (CSI-RS) resources, each identifying a set of one more resource elements on which to transmit a CSI-RS and a set of one or more ports from which to transmit the CSI-RS. Each CSI-RS resource may further identify multiplexing options for the CSI-RS. For example, the CSI-RS resource mapping circuitry 741 shown and described above in reference to FIG. 7 may configure the CSI-RS resources.

At block 1304, for a CSI-RS resource of the plurality of CSI-RS resources, the scheduling entity may configure a set of one or more port groups, each identifying a group of ports within the respective set of ports associated with a channel. In some examples, the ports within the port group may be utilized by a scheduled entity to measure the CSI, and the other ports outside of the port group may be utilized by the scheduled entity to measure the interference. In some examples, each port group within the set of one or more port groups for a CSI-RS resource may include consecutive numbered ports. In some examples, the set of one or more port groups for a CSI-RS resource may include nested port groups based on the number of ports included within each port group. For example, a first nested port group may include all of the ports within a second nested port group, but the second nested port group may include a fewer number of ports than the first nested port group.

At block 1306, the scheduling entity may determine whether there are more CSI-RS resources. If so (Y branch of block 1306), the process returns to block 1304, where the scheduling entity configures the port groups for the next CSI-RS resource. In some examples, after all of the port groups have been configured, the scheduling entity may transmit the set of one or more port groups for each of the CSI-RS resources to a set of scheduled entities served by the scheduling entity. For example, the set of port groups for each of the CSI-RS resources may be transmitted within a radio resource control (RRC) message. For example, the CSI-RS resource mapping circuitry 741 shown and described above in reference to FIG. 7 may configure the port groups for each CSI-RS resource.

Once all of the port groups have been configured for each of the CSI-RS resources (N branch of block 1306), at block 1308, the scheduling entity may select a CSI-RS resource from the plurality of CSI-RS resources and a port group from the set of one or more port groups of the CSI-RS resource for a particular scheduled entity. In some examples, the port group may be selected based on the maximum number of ports supported by the scheduled entity. For example, the resource assignment and scheduling circuitry 742 shown and described above in reference to FIG. 7 may select the CSI-RS resource and port group for the scheduled entity.

At block 1310, the scheduling entity may transmit an indication of the CSI-RS resource and the port group selected for the scheduled entity to the scheduled entity. In some examples, the indication of the selected CSI-RS resource and port group may be transmitted within DCI of a PDCCH. In other examples, the indication of the selected CSI-RS resource and port group may be transmitted within an RRC message or a MAC CE. For example, the DL traffic and control channel generation and transmission circuitry 743 shown and described above in reference to FIG. 7 may transmit the indication of the selected CSI-RS resource and port group to the scheduled entity.

At block 1312, the scheduling entity may transmit the CSI-RS to the scheduled entity utilizing the set of one or more resource elements and the set of one or more ports associated with the selected CSI-RS resource. For example, the DL traffic and control channel generation and transmission circuitry 743 shown and described above in reference to FIG. 7 may transmit the CSI-RS to the scheduled entity.

Figure 14:
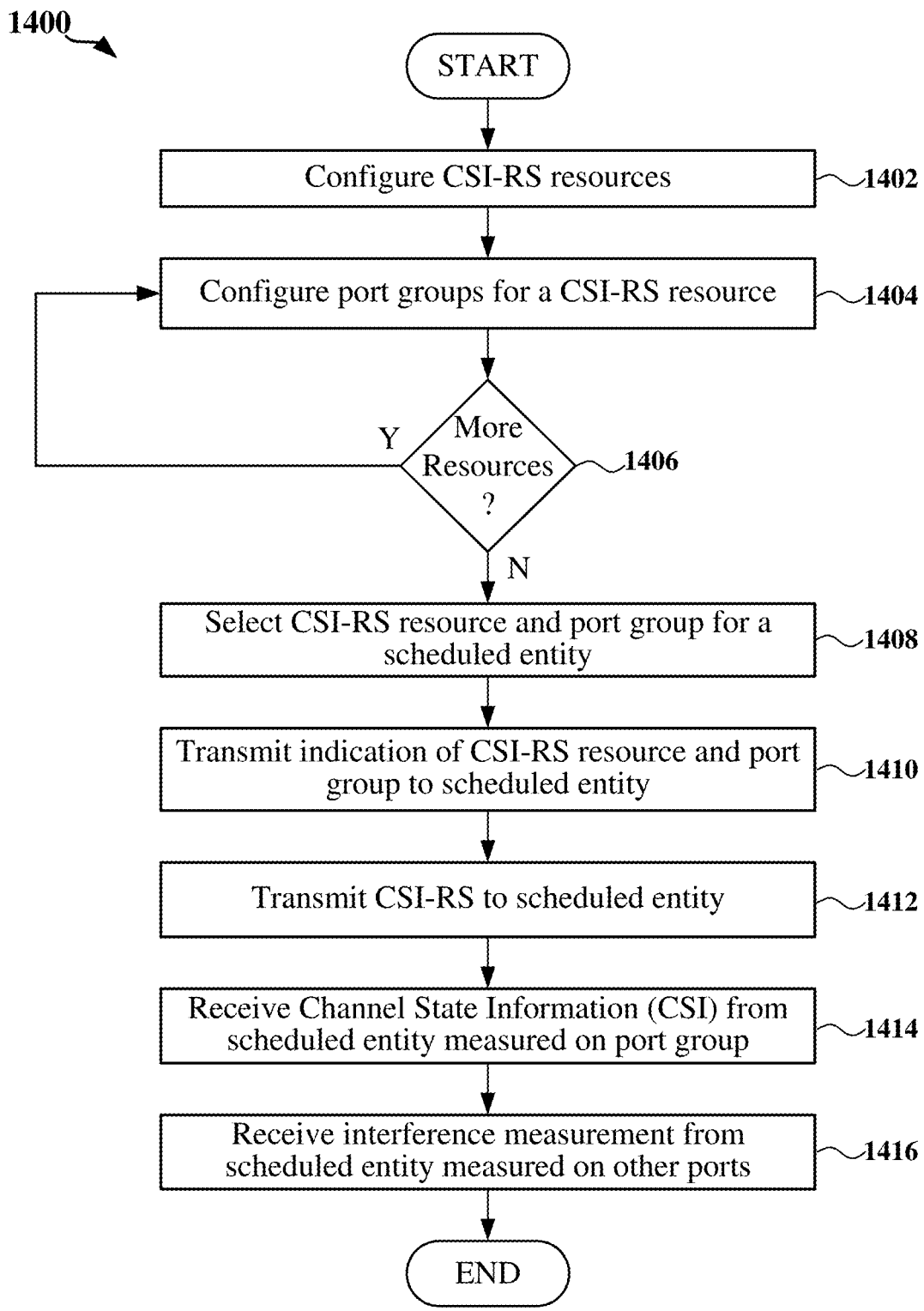
FIG. 14 is a flow chart of another method of configuring port groups for CSI-RS resources in a wireless communication network according to some aspects of the present disclosure.

FIG. 14 is a flow chart illustrating an exemplary process 1400 for configuring port groups for channel state information reference signal (CSI-RS) resources in a wireless communication network according to some aspects of the present disclosure. As described below, some or all illustrated features may be omitted in a particular implementation within the scope of the present disclosure, and some illustrated features may not be required for implementation of all embodiments. In some examples, the process 1400 may be carried out by the scheduling entity 700 illustrated in FIG. 7. In some examples, the process 1400 may be carried out by any suitable apparatus or means for carrying out the functions or algorithm described below.

At block 1402, the scheduling entity may configure a plurality of channel state information reference signal (CSI-RS) resources, each identifying a set of one more resource elements on which to transmit a CSI-RS and a set of one or more ports from which to transmit the CSI-RS. Each CSI-RS resource may further identify multiplexing options for the CSI-RS. For example, the CSI-RS resource mapping circuitry 741 shown and described above in reference to FIG. 7 may configure the CSI-RS resources.

At block 1404, for a CSI-RS resource of the plurality of CSI-RS resources, the scheduling entity may configure a set of one or more port groups, each identifying a group of ports within the respective set of ports associated with a channel. In some examples, the ports within the port group may be utilized by a scheduled entity to measure the CSI, and the other ports outside of the port group may be utilized by the scheduled entity to measure the interference. In some examples, each port group within the set of one or more port groups for a CSI-RS resource may include consecutive numbered ports. In some examples, the set of one or more port groups for a CSI-RS resource may include nested port groups based on the number of ports included within each port group. For example, a first nested port group may include all of the ports within a second nested port group, but the second nested port group may include a fewer number of ports than the first nested port group.

At block 1406, the scheduling entity may determine whether there are more CSI-RS resources. If so (Y branch of block 1406), the process returns to block 1404, where the scheduling entity configures the port groups for the next CSI-RS resource. In some examples, after all of the port groups have been configured, the scheduling entity may transmit the set of one or more port groups for each of the CSI-RS resources to a set of scheduled entities served by the scheduling entity. For example, the set of port groups for each of the CSI-RS resources may be transmitted within a radio resource control (RRC) message. For example, the CSI-RS resource mapping circuitry 741 shown and described above in reference to FIG. 7 may configure the port groups for each CSI-RS resource.

Once all of the port groups have been configured for each of the CSI-RS resources (N branch of block 1406), at block 1408, the scheduling entity may select a CSI-RS resource from the plurality of CSI-RS resources and a port group from the set of one or more port groups of the CSI-RS resource for a particular scheduled entity. In some examples, the port group may be selected based on the maximum number of ports supported by the scheduled entity. For example, the resource assignment and scheduling circuitry 742 shown and described above in reference to FIG. 7 may select the CSI-RS resource and port group for the scheduled entity.

At block 1410, the scheduling entity may transmit an indication of the CSI-RS resource and the port group selected for the scheduled entity to the scheduled entity. In some examples, the indication of the selected CSI-RS resource and port group may be transmitted within DCI of a PDCCH. In other examples, the indication of the selected CSI-RS resource and port group may be transmitted within an RRC message or a MAC CE. For example, the DL traffic and control channel generation and transmission circuitry 743 shown and described above in reference to FIG. 7 may transmit the indication of the selected CSI-RS resource and port group to the scheduled entity.

At block 1412, the scheduling entity may transmit the CSI-RS to the scheduled entity utilizing the set of one or more resource elements and the set of one or more ports associated with the selected CSI-RS resource. For example, the DL traffic and control channel generation and transmission circuitry 743 shown and described above in reference to FIG. 7 may transmit the CSI-RS to the scheduled entity.

At block 1414, the scheduling entity may receive channel state information (CSI) from the scheduled entity. In some examples, the CSI may be measured on the group of ports indicated by the selected port group. At block 1416, the scheduling entity may receive an interference measurement from the scheduled entity. In some examples, the interference measurement may be measured at least in part on other ports within the set of ports associated with the selected CSI-RS resource that are outside of the group of ports within the selected port group. For example, the UL traffic and control channel reception and processing circuitry 744 shown and described above in reference to FIG. 7 may receive the CSI and interference measurement from the scheduled entity.

Figure 15:
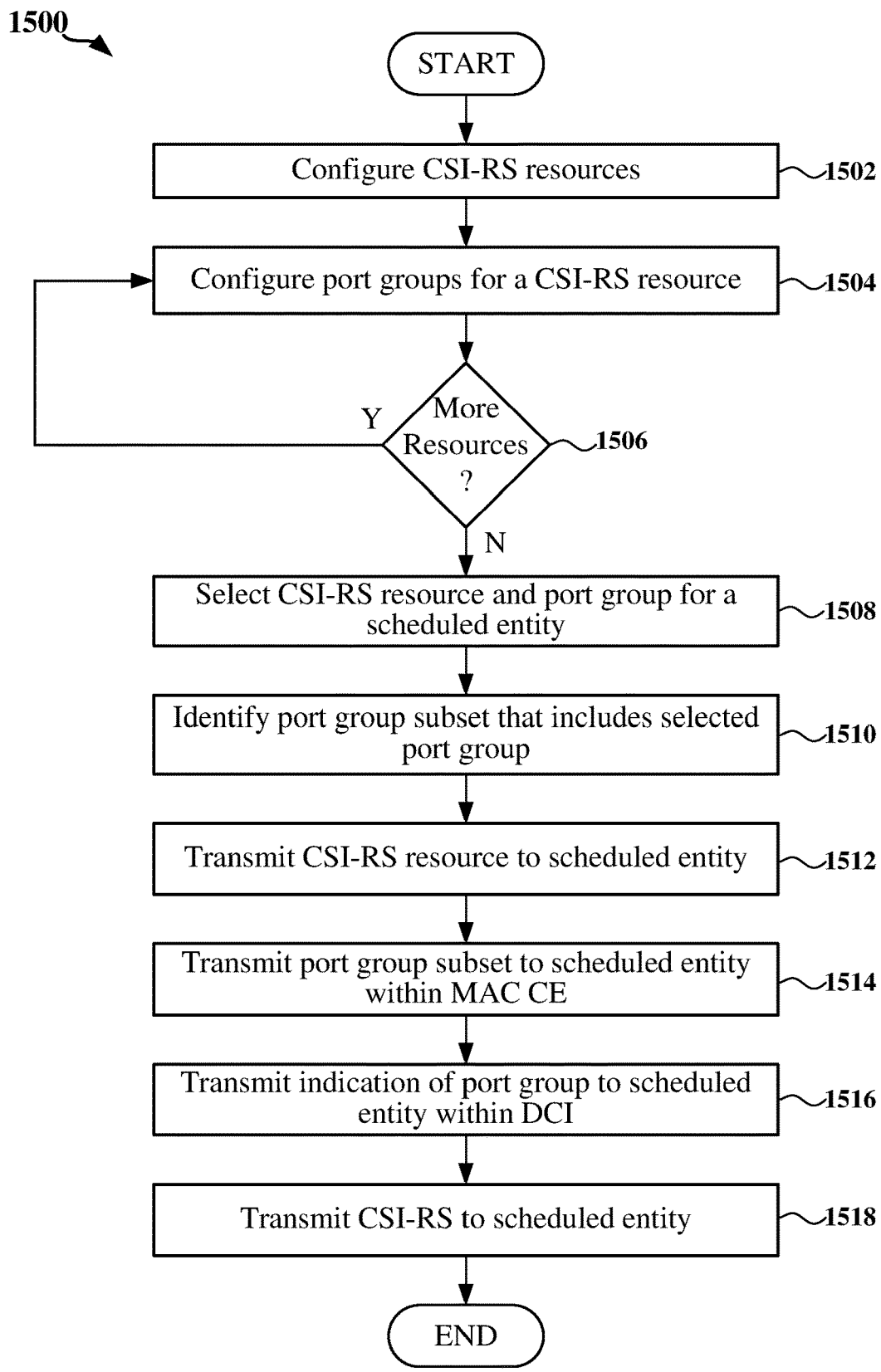
FIG. 15 is a flow chart of another method of configuring port groups for CSI-RS resources in a wireless communication network according to some aspects of the present disclosure.

FIG. 15 is a flow chart illustrating an exemplary process 1500 for configuring port groups for channel state information reference signal (CSI-RS) resources in a wireless communication network according to some aspects of the present disclosure. As described below, some or all illustrated features may be omitted in a particular implementation within the scope of the present disclosure, and some illustrated features may not be required for implementation of all embodiments. In some examples, the process 1500 may be carried out by the scheduling entity 700 illustrated in FIG. 7. In some examples, the process 1500 may be carried out by any suitable apparatus or means for carrying out the functions or algorithm described below.

At block 1502, the scheduling entity may configure a plurality of channel state information reference signal (CSI-RS) resources, each identifying a set of one more resource elements on which to transmit a CSI-RS and a set of one or more ports from which to transmit the CSI-RS. Each CSI-RS resource may further identify multiplexing options for the CSI-RS. For example, the CSI-RS resource mapping circuitry 741 shown and described above in reference to FIG. 7 may configure the CSI-RS resources.

At block 1504, for a CSI-RS resource of the plurality of CSI-RS resources, the scheduling entity may configure a set of one or more port groups, each identifying a group of ports within the respective set of ports associated with a channel. In some examples, the ports within the port group may be utilized by a scheduled entity to measure the CSI, and the other ports outside of the port group may be utilized by the scheduled entity to measure the interference. In some examples, each port group within the set of one or more port groups for a CSI-RS resource may include consecutive numbered ports. In some examples, the set of one or more port groups for a CSI-RS resource may include nested port groups based on the number of ports included within each port group. For example, a first nested port group may include all of the ports within a second nested port group, but the second nested port group may include a fewer number of ports than the first nested port group.

At block 1506, the scheduling entity may determine whether there are more CSI-RS resources. If so (Y branch of block 1506), the process returns to block 1504, where the scheduling entity configures the port groups for the next CSI-RS resource. In some examples, after all of the port groups have been configured, the scheduling entity may transmit the set of one or more port groups for each of the CSI-RS resources to a set of scheduled entities served by the scheduling entity. For example, the set of port groups for each of the CSI-RS resources may be transmitted within a radio resource control (RRC) message. For example, the CSI-RS resource mapping circuitry 741 shown and described above in reference to FIG. 7 may configure the port groups for each CSI-RS resource.

Once all of the port groups have been configured for each of the CSI-RS resources (N branch of block 1506), at block 1508, the scheduling entity may select a CSI-RS resource from the plurality of CSI-RS resources and a port group from the set of one or more port groups of the CSI-RS resource for a particular scheduled entity. In some examples, the port group may be selected based on the maximum number of ports supported by the scheduled entity. For example, the resource assignment and scheduling circuitry 742 shown and described above in reference to FIG. 7 may select the CSI-RS resource and port group for the scheduled entity.

At block 1510, the scheduling entity may identify a port group subset that includes the selected port group. Each port group subset may include a subset of all of the port groups configured for the CSI-RS resource. For example, if there are eight port groups configured for a CSI-RS resource, a first port group subset may include four of the port groups and a second port group subset may include the other four port groups. For example, the resource assignment and scheduling circuitry 742 shown and described above in reference to FIG. 7 may identify the port group subset that includes the selected port group.

At block 1512, the scheduling entity may transmit an indication of the CSI-RS resource selected for the scheduled entity to the scheduled entity. In some examples, the indication of the selected CSI-RS resource may be transmitted within DCI of a PDCCH. For example, the DL traffic and control channel generation and transmission circuitry 743 shown and described above in reference to FIG. 7 may transmit the indication of the selected CSI-RS resource to the scheduled entity.

At block 1514, the scheduling entity may transmit a port group subset indication indicating the port group subset that includes the selected port group to the scheduled entity. In some examples, the port group subset indication may be transmitted within a MAC CE. For example, the DL traffic and control channel generation and transmission circuitry 743 shown and described above in reference to FIG. 7 may transmit the indication of the port group subset to the scheduled entity.

At block 1516, the scheduling entity may transmit an indication of the selected port group to the scheduled entity. In some examples, the selected port group indication may be transmitted within DCI of a PDCCH. For example, the DL traffic and control channel generation and transmission circuitry 743 shown and described above in reference to FIG. 7 may transmit the indication of the selected port group to the scheduled entity.

At block 1518, the scheduling entity may transmit the CSI-RS to the scheduled entity utilizing the set of one or more resource elements and the set of one or more ports associated with the selected CSI-RS resource. For example, the DL traffic and control channel generation and transmission circuitry 743 shown and described above in reference to FIG. 7 may transmit the CSI-RS to the scheduled entity.

Figure 16:
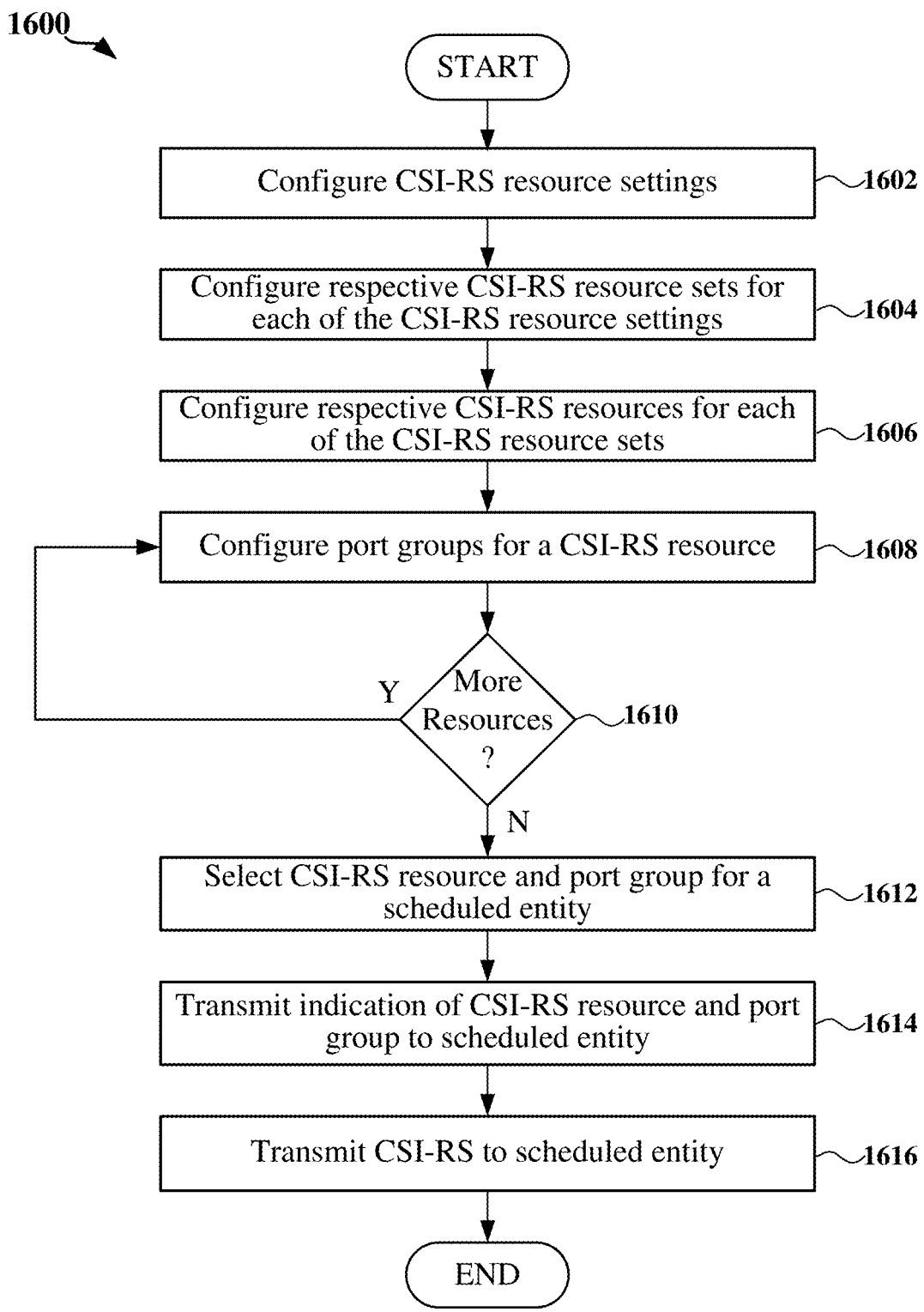
FIG. 16 is a flow chart of another method of configuring port groups for CSI-RS resources in a wireless communication network according to some aspects of the present disclosure.

FIG. 16 is a flow chart illustrating an exemplary process 1600 for configuring port groups for channel state information reference signal (CSI-RS) resources in a wireless communication network according to sonic aspects of the present disclosure. As described below, some or all illustrated features may be omitted in a particular implementation within the scope of the present disclosure, and some illustrated features may not be required for implementation of all embodiments. In some examples, the process 1600 may be carried out by the scheduling entity 700 illustrated in FIG. 7. In some examples, the process 1600 may be carried out by any suitable apparatus or means for carrying out the functions or algorithm described below.

At block 1602, the scheduling entity may configure a set of one or more CSI-RS resource settings, each associated with a respective report setting indicating a type and periodicity of a report to be generated based on a measurement of the CSI-RS. At block 1604, for each CSI-RS resource setting, the scheduling entity may configure a set of one or more CSI-RS resource sets, each indicating a configuration of the report or the measurement associated with the CSI-RS resource setting. For example, the CSI-RS resource mapping circuitry 741 shown and described above in reference to FIG. 7 may configure the CSI-RS resource settings and the CSI-RS resource sets.

At block 1606, the scheduling entity may configure a plurality of channel state information reference signal (CSI-RS) resources, each identifying a set of one more resource elements on which to transmit a CSI-RS and a set of one or more ports from which to transmit the CSI-RS. Each CSI-RS resource may further identify multiplexing options for the CSI-RS. In some examples, the CSI-RS resources may be divided between the CSI-RS resource sets. For example, the CSI-RS resource mapping circuitry 741 shown and described above in reference to FIG. 7 may configure the CSI-RS resources.

At block 1608, for a CSI-RS resource of the plurality of CSI-RS resources, the scheduling entity may configure a set of one or more port groups, each identifying a group of ports within the respective set of ports associated with a channel. In some examples, the ports within the port group may be utilized by a scheduled entity to measure the CSI, and the other ports outside of the port group may be utilized by the scheduled entity to measure the interference. In some examples, each port group within the set of one or more port groups for a CSI-RS resource may include consecutive numbered ports. In some examples, the set of one or more port groups for a CSI-RS resource may include nested port groups based on the number of ports included within each port group. For example, a first nested port group may include all of the ports within a second nested port group, but the second nested port group may include a fewer number of ports than the first nested port group.

At block 1610, the scheduling entity may determine whether there are more CSI-RS resources. If so (Y branch of block 1610), the process returns to block 1608, where the scheduling entity configures the port groups for the next CSI-RS resource. In some examples, after all of the port groups have been configured, the scheduling entity may transmit the set of one or more port groups for each of the CSI-RS resources to a set of scheduled entities served by the scheduling entity. For example, the set of port groups for each of the CSI-RS resources may be transmitted within a radio resource control (RRC) message. For example, the CSI-RS resource mapping circuitry 741 shown and described above in reference to FIG. 7 may configure the port groups for each CSI-RS resource.

Once all of the port groups have been configured for each of the CSI-RS resources (N branch of block 1610), at block 1612, the scheduling entity may select a CSI-RS resource from the plurality of CSI-RS resources and a port group from the set of one or more port groups of the CSI-RS resource for a particular scheduled entity. In some examples, the port group may be selected based on the maximum number of ports supported by the scheduled entity. For example, the resource assignment and scheduling circuitry 742 shown and described above in reference to FIG. 7 may select the CSI-RS resource and port group for the scheduled entity.

At block 1614, the scheduling entity may transmit an indication of the CSI-RS resource and the port group selected for the scheduled entity to the scheduled entity. In some examples, the indication of the selected CSI-RS resource and port group may be transmitted within DCI of a PDCCH. In other examples, the indication of the selected CSI-RS resource and port group may be transmitted within an RRC message or a MAC CE. For example, the DL traffic and control channel generation and transmission circuitry 743 shown and described above in reference to FIG. 7 may transmit the indication of the selected CSI-RS resource and port group to the scheduled entity.

At block 1616, the scheduling entity may transmit the CSI-RS to the scheduled entity utilizing the set of one or more resource elements and the set of one or more ports associated with the selected CSI-RS resource. For example, the DL traffic and control channel generation and transmission circuitry 743 shown and described above in reference to FIG. 7 may transmit the CSI-RS to the scheduled entity.

Figure 17:
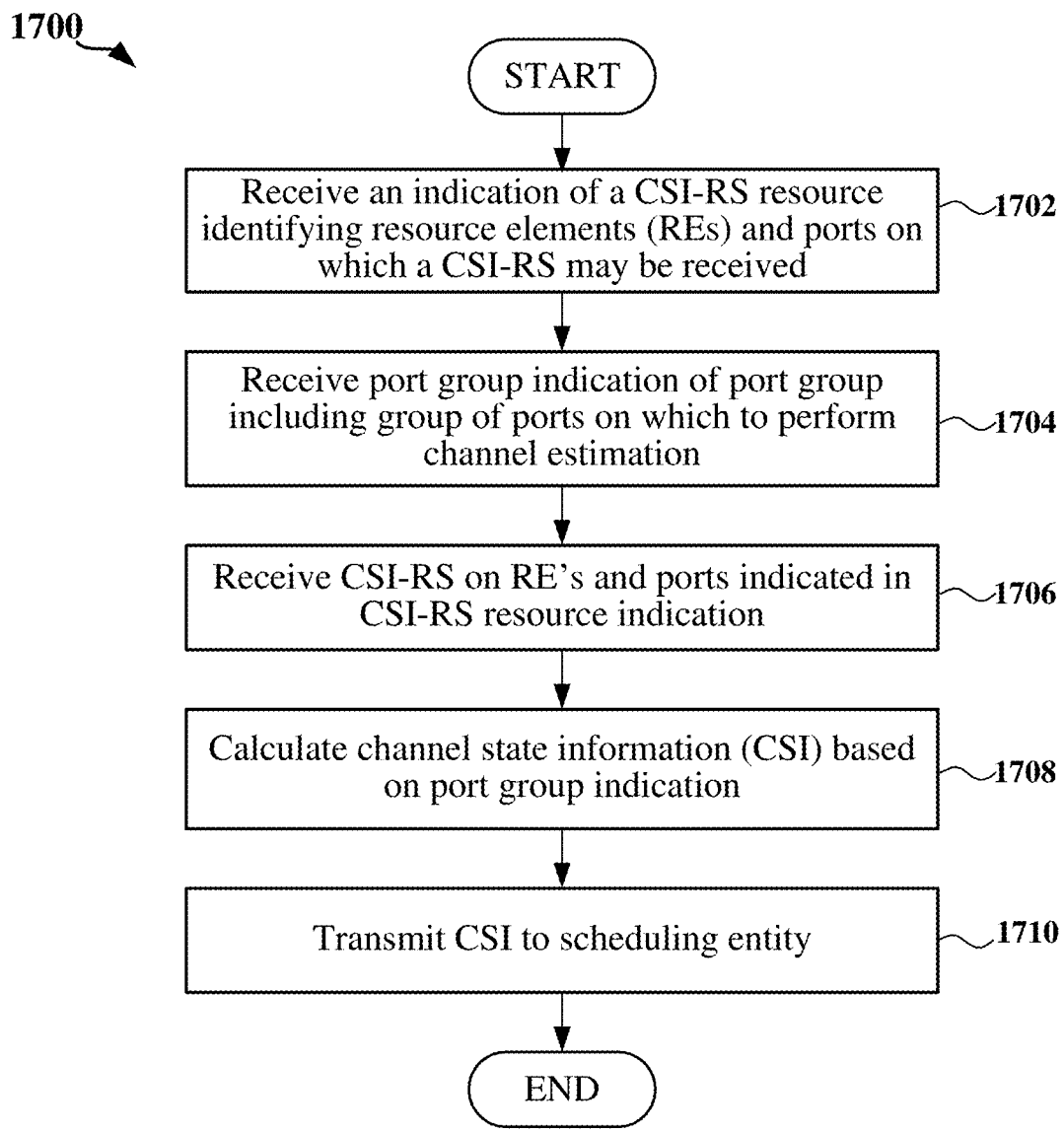
FIG. 17 is a flow chart of a method of calculating channel state information utilizing port groups for CSI-RS resources in a wireless communication network according to some aspects of the present disclosure.

FIG. 17 is a flow chart illustrating an exemplary process 1700 for calculating channel state information utilizing port groups for CSI-RS resources in a wireless communication network according to some aspects of the present disclosure. As described below, some or all illustrated features may be omitted in a particular implementation within the scope of the present disclosure, and some illustrated features may not be required for implementation of all embodiments. In some examples, the process 1700 may be carried out by the scheduled entity 800 illustrated in FIG. 8. In some examples, the process 1700 may be carried out by any suitable apparatus or means for carrying out the functions or algorithm described below.

At block 1702, the scheduled entity may receive an indication of a channel state information reference signal (CSI-RS) resource identifying a set of one or more resource elements on which to receive a CSI-RS and a set of one or more ports from which to receive the CSI-RS from a scheduling entity. In some examples, the indication of the selected CSI-RS resource may be received within DCI of a PDCCH. In other examples, the indication of the selected CSI-RS resource may be received within an RRC message or a MAC CE. For example, the DL traffic and control channel reception and processing circuitry 844 shown and described above in reference to FIG. 8 may receive the indication of the CSI-RS resource.

At block 1704, the scheduled entity may receive a port group indication of a port group that includes a group of ports within the set of ports of the CSI-RS resource on which to perform channel estimation of a channel. In some examples, the port group may be received within DCI of a PDCCH. In other examples, the port group may be received within an RRC message or a MAC CE. In still other examples, a port group subset within the set of port groups for the CSI-RS resource that includes the port group may be received within a MAC CE, while the indication of the port group may be received within the DCI of a PDCCH. For example, the DL traffic and control channel reception and processing circuitry 844 shown and described above in reference to FIG. 8 may receive the indication of the CSI-RS resource.

At block 1706, the scheduled entity may receive the CSI-RS on the set of one or more resource elements and the set of one or more ports associated with the CSI-RS resource. For example, the DL traffic and control channel reception and processing circuitry 844 shown and described above in reference to FIG. 8 may receive the CSI-RS.

At block 1708, the scheduled entity may calculate channel state information (CSI) based on the port group indication. For example, the scheduled entity may calculate the CSI on the group of ports within the port group indicated by the port group indication. In some examples, the scheduled entity may further measure a non-zero-power (NZP) interference measurement on at least the other ports within the set of ports outside of the group of ports. For example, the channel state information processing circuitry 846 shown and described above in reference to FIG. 8 may calculate the CSI.

At block 1710, the scheduled entity may transmit the CSI to the scheduling entity. In some examples, the scheduled entity may further transmit the NZP interference measurement to the scheduling entity. For example, the UL traffic and control channel generation and transmission circuitry 842 together with the transceiver 810 shown and described above in reference to FIG. 8 may transmit the CSI to the scheduling entity.

In one configuration, a scheduling entity (e.g., a base station) in wireless communication with a set of one or more scheduled entities (e.g., UEs) in a wireless communication network includes means for configuring a plurality of channel state information reference signal (CSI-RS) resources, each identifying a set of one more resource elements on which to transmit a CSI-RS and a set of one or more ports from which to transmit the CSI-RS. The scheduling entity further includes, for each of the plurality of CSI-RS resources, means for configuring a set of one or more port groups, each identifying a group of ports within the respective set of ports associated with a channel. The scheduling entity further includes means for selecting a CSI-RS resource from the plurality of CSI-RS resources and a port group from the set of one or more port groups of the CSI-RS resource for a scheduled entity of the set of one or more scheduled entities, means for transmitting an indication of the CSI-RS resource and the port group selected for the scheduled entity to the scheduled entity, and means for transmitting the CSI-RS to the scheduled entity utilizing the set of one or more resource elements and the set of one or more ports associated with the CSI-RS resource.

In one aspect, the aforementioned means for configuring the CSI-RS resources and the respective set of one or more port groups for each of the CSI-RS resources may be the processor(s) 704 shown in FIG. 7 configured to perform the functions recited by the aforementioned means. For example, the aforementioned means for configuring the CSI-RS resources and the respective set of one or more port groups for each of the CSI-RS resources may include the CSI-RS resource mapping circuitry 741 shown in FIG. 7. In another aspect, the aforementioned means for selecting the CSI-RS resource and the port group for a scheduled entity may be the processor(s) 704 shown in FIG. 7 configured to perform the functions recited by the aforementioned means. For example, the aforementioned means for selecting the CSI-RS resource and port group for the scheduled entity may include the resource assignment and scheduling circuitry 742 shown in FIG. 7. In another aspect, the aforementioned means for transmitting the indications of the selected CSI-RS resource and port group to the scheduled entity may be the transceiver 710 and the processor(s) 704 shown in FIG. 7 configured to perform the functions recited by the aforementioned means. For example, the aforementioned means for transmitting the indications of the selected CSI-RS resource and port group to the scheduled entity may include the DL traffic and control channel generation and transmission circuitry 743 shown in FIG. 7. In still another aspect, the aforementioned means may be a circuit or any apparatus configured to perform the functions recited by the aforementioned means.

In another configuration, a scheduled entity (e.g., UE) in wireless communication with a scheduling entity (e.g., base station) in a wireless communication network includes means for receiving an indication of a channel state information reference signal (CSI-RS) resource identifying a set of one more resource elements on which to receive a CSI-RS and a set of one or more ports from which to receive the CSI-RS, means for receiving a port group indication of a port group that includes a group of ports within the set of one or more ports of the CSI-RS resource on which to perform channel estimation of a channel, and means for receiving the CSI-RS on the set of one or more resource elements and the set of one or more ports associated with the CSI-RS resource. The scheduled entity further includes means for calculating channel state information (CSI) on the group of ports indicated by the port group indication and means for transmitting the CSI to the scheduling entity.

In one aspect, the aforementioned means for receiving the CSI-RS resource indication, the port group indication, and the CSI-RS may be the transceiver 810 and the processor(s) 804 shown in FIG. 8 configured to perform the functions recited by the aforementioned means. For example, the aforementioned means for receiving the CSI-RS resource indication, port group indication, and CSI-RS may include the DL traffic and control channel reception and processing circuity 844 shown in FIG. 8. In another aspect, the aforementioned means for calculating the CSI may be the processor(s) 804 shown in FIG. 8 configured to perform the functions recited by the aforementioned means. For example, the aforementioned means for calculating the CSI may include the channel state information processing circuitry 846 shown in FIG. 8. In another aspect, the aforementioned means for transmitting the CSI to the scheduling entity may include the transceiver 810 and the processor(s) 804 shown in FIG. 8 configured to perform the functions recited by the aforementioned means. For example, the aforementioned means for transmitting the CSI may include the UL traffic and control channel generation and transmission circuitry 842 shown in FIG. 8. In still another aspect, the aforementioned means may be a circuit or any apparatus configured to perform the functions recited by the aforementioned means.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11. (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 7, and/or 8 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication between a scheduling entity and a set of one or more scheduled entities in a wireless communication network, the method comprising, at the scheduling entity:
   configuring a plurality of channel state information reference signal (CSI-RS) resources, each identifying a set of resource elements on which to transmit a CSI-RS and a set of ports from which to transmit the CSI-RS;
   for each of the plurality of CSI-RS resources, configuring a set of one or more port groups, each identifying a group of ports within the respective set of ports associated with a channel, wherein the group of ports comprises less than all of the set of ports;
   selecting a CSI-RS resource from the plurality of CSI-RS resources and a port group from the set of one or more port groups of the CSI-RS resource for a scheduled entity of the set of one or more scheduled entities;
   transmitting an indication of the CSI-RS resource and the port group selected for the scheduled entity to the scheduled entity;
   transmitting the CSI-RS to the scheduled entity utilizing all of the set of resource elements and all of the set of ports associated with the CSI-RS resource;
   receiving channel state information (CSI) from the scheduled entity measured on the group of ports indicated by the port group; and
   receiving an interference measurement from the scheduled entity measured at least in part on other ports within the set of ports outside of the group of ports.

2. The method of claim 1, further comprising:
   transmitting the set of one or more port groups for each of the plurality of CSI-RS resources to the set of one or more scheduled entities.

3. The method of claim 2, wherein transmitting the set of one or more port groups for each of the plurality of CSI-RS resources further comprises:
   transmitting the set of one or more port groups for each of the plurality of CSI-RS resources to the set of one or more scheduled entities within a radio resource control (RRC) message.

4. The method of claim 1, wherein transmitting the indication of the CSI-RS resource and the port group selected for the scheduled entity to the scheduled entity further comprises:
   transmitting the indication of the CSI-RS resource and the port group selected for the scheduled entity to the scheduled entity within downlink control information (DCI) of a physical downlink control channel (PDCCH).

5. The method of claim 4, wherein transmitting the indication of the CSI- RS resource and the port group selected for the scheduled entity to the scheduled entity further comprises:
   identifying a port group subset within the set of one or more port groups for the CSI-RS resource selected for the scheduled entity that comprises the port group selected for the scheduled entity;
   transmitting a port group subset indication to the scheduled entity within a media access control (MAC) control element (CE); and
   transmitting the indication of the port group selected for the scheduled entity within the DCI of the PDCCH.

6. The method of claim 1, wherein transmitting the indication of the CSI-RS resource and the port group selected for the scheduled entity to the scheduled entity further comprises:
   transmitting the indication of the CSI-RS resource and the port group selected for the scheduled entity to the scheduled entity within a radio resource control (RRC) message or a MAC CE.

7. The method of claim 1, wherein each port group within the set of one or more port groups for each of the CSI-RS resources comprises consecutive numbered ports.

8. The method of claim 1, wherein the set of one or more port groups for at least one of the CSI-RS resources comprises nested port groups based on a number of ports included within each port group of the set of one or more port groups.

9. The method of claim 8, wherein a first port group within the set of one or more port groups for a first CSI-RS resource of the plurality of CSI-RS resources comprises a first group of ports and a first number of ports and a second port group within the set of one or more port groups for the first CSI-RS resource comprises a second group of ports and a second number of ports less than the first number of ports, wherein the first group of ports comprises all of the second group of ports.

10. The method of claim 1, wherein selecting the CSI-RS resource from the plurality of CSI-RS resources and the port group from the set of one or more port groups of the CSI-RS resource for the scheduled entity of the set of one or more scheduled entities further comprises:
    selecting the port group from the set of one or more port groups of the CSI-RS resource based on a maximum number of ports supported by the scheduled entity.

11. The method of claim 1, further comprising:
    configuring a set of one or more CSI-RS resource settings, each associated with a respective report setting indicating a type and periodicity of a report to be generated based on a measurement of the CSI-RS; and
    for each CSI-RS resource setting within the set of one or more CSI-resource settings, configuring a set of one or more CSI-RS resource sets, each indicating a configuration of the report or the measurement associated with the CSI-RS resource setting;
    wherein each CSI-RS resource set of the set of one or more CSI-RS resource sets comprises respective CSI-RS resources of the plurality of CSI-RS resources.

12. A scheduling entity in wireless communication with a set of one or more scheduled entities in a wireless communication network, comprising:
    a processor;
    a transceiver communicatively coupled to the processor; and
    a memory communicatively coupled to the processor, wherein the processor is configured to:
      configure and maintain within the memory a plurality of channel state information reference signal (CSI-RS) resources, each identifying a set of resource elements on which to transmit a CSI-RS and a set of ports from which to transmit the CSI-RS;
      for each of the plurality of CSI-RS resources, configure and maintain within the memory a set of one or more port groups, each identifying a group of ports within the respective set of ports associated with a channel, wherein the group of ports comprises less than all of the set of ports;

select a CSI-RS resource from the plurality of CSI-RS resources and a port group from the set of one or more port groups of the CSI-RS resource for a scheduled entity of the set of one or more scheduled entities;

transmit an indication of the CSI-RS resource and the port group selected for the scheduled entity to the scheduled entity via the transceiver;

transmit the CSI-RS to the scheduled entity utilizing all of the set of resource elements and all of the set of ports associated with the CSI-RS resource;

receive channel state information (CSI) from the scheduled entity measured on the group of ports indicated by the port group; and receive an interference measurement from the scheduled entity measured at least in part on other ports within the set of ports outside of the group of ports.

13. The scheduling entity of claim 12, wherein the processor is further configured to:

transmit the set of one or more port groups for each of the plurality of CSI-RS resources to the set of one or more scheduled entities.

14. The scheduling entity of claim 13, wherein the processor is further configured to:

transmit the set of one or more port groups for each of the plurality of CSI-RS resources to the set of one or more scheduled entities within a radio resource control (RRC) message.

15. The scheduling entity of claim 12, wherein the processor is further configured to:

transmit the indication of the CSI-RS resource and the port group selected for the scheduled entity to the scheduled entity within downlink control information (DCI) of a physical downlink control channel (PDCCH).

16. The scheduling entity of claim 15, wherein the processor is further configured to:

identify a port group subset within the set of one or more port groups for the CSI-RS resource selected for the scheduled entity that comprises the port group selected for the scheduled entity;

transmit a port group subset indication to the scheduled entity within a media access control (MAC) control element (CE); and transmit the indication of the port group selected for the scheduled entity within the DCI of the PDCCH.

17. The scheduling entity of claim 12, wherein the processor is further configured to:

transmit the indication of the CSI-RS resource and the port group selected for the scheduled entity to the scheduled entity within a radio resource control (RRC) message or a MAC CE.

18. The scheduling entity of claim 12, wherein each port group within the set of one or more port groups for each of the CSI-RS resources comprises consecutive numbered ports.

19. The scheduling entity of claim 12, wherein the set of one or more port groups for at least one of the CSI-RS resources comprises nested port groups based on a number of ports included within each port group of the set of one or more port groups.

20. The scheduling entity of claim 19, wherein a first port group within the set of one or more port groups for a first CSI-RS resource of the plurality of CSI-RS resources comprises a first group of ports and a first number of ports and a second port group within the set of one or more port groups for the first CSI-RS resource comprises a second group of ports and a second number of ports less than the first number of ports, wherein the first group of ports comprises all of the second group of ports.

21. The scheduling entity of claim 12, wherein the processor is further configured to:

select the port group from the set of one or more port groups of the CSI-RS resource based on a maximum number of ports supported by the scheduled entity.

22. The scheduling entity of claim 12, wherein the processor is further configured to:

configure a set of one or more CSI-RS resource settings, each associated with a respective report setting indicating a type and periodicity of a report to be generated based on a measurement of the CSI-RS; and for each CSI-RS resource setting within the set of one or more CSI-resource settings, configure a set of one or more CSI-RS resource sets, each indicating a configuration of the report or the measurement associated with the CSI-RS resource setting;

wherein each CSI-RS resource set of the set of one or more CSI-RS resource sets comprises respective CSI-RS resources of the plurality of CSI-RS resources.

23. A scheduling entity in wireless communication with a set of one or more scheduled entities in a wireless communication network, comprising:

means for configuring a plurality of channel state information reference signal (CSI-RS) resources, each identifying a set of resource elements on which to transmit a CSI-RS and a set of ports from which to transmit the CSI-RS;

for each of the plurality of CSI-RS resources, means for configuring a set of one or more port groups, each identifying a group of ports within the respective set of ports associated with a channel, wherein the group of ports comprises less than all of the set of ports;

means for selecting a CSI-RS resource from the plurality of CSI-RS resources and a port group from the set of one or more port groups of the CSI-RS resource for a scheduled entity of the set of one or more scheduled entities;

means for transmitting an indication of the CSI-RS resource and the port group selected for the scheduled entity to the scheduled entity;

means for transmitting the CSI-RS to the scheduled entity utilizing all of the set of resource elements and all of the set of ports associated with the CSI-RS resource;

means for receiving channel state information (CSI) from the scheduled entity measured on the group of ports indicated by the port group; and means for receiving an interference measurement from the scheduled entity measured at least in part on other ports within the set of ports outside of the group of ports.

24. The scheduling entity of claim 23, further comprising:

means for transmitting the set of one or more port groups for each of the plurality of CSI-RS resources to the set of one or more scheduled entities.

25. The scheduling entity of claim 24, wherein the means for transmitting the set of one or more port groups for each of the CSI-RS resources further comprises:

means for transmitting the set of one or more port groups for each of the plurality of CSI-RS resources to the set of one or more scheduled entities within a radio resource control (RRC) message.

26. The scheduling entity of claim 23, wherein the means for transmitting the indication of the CSI-RS resource and the port group selected for the scheduled entity to the scheduled entity further comprises:
  means for transmitting the indication of the CSI-RS resource and the port group selected for the scheduled entity to the scheduled entity within downlink control information (DCI) of a physical downlink control channel (PDCCH).

27. The scheduling entity of claim 26, wherein the means for transmitting the indication of the CSI-RS resource and the port group selected for the scheduled entity to the scheduled entity further comprises:
  means for identifying a port group subset within the set of one or more port groups for the CSI-RS resource selected for the scheduled entity that comprises the port group selected for the scheduled entity;
  means for transmitting a port group subset indication to the scheduled entity within a media access control (MAC) control element (CE); and
  means for transmitting the indication of the port group selected for the scheduled entity within the DCI of the PDCCH.

28. The scheduling entity of claim 23, wherein the means for transmitting the indication of the CSI-RS resource and the port group selected for the scheduled entity to the scheduled entity further comprises:
  means for transmitting the indication of the CSI-RS resource and the port group selected for the scheduled entity to the scheduled entity within a radio resource control (RRC) message or a MAC CE.

29. The scheduling entity of claim 23, wherein each port group within the set of one or more port groups for each of the CSI-RS resources comprises consecutive numbered ports.

30. The scheduling entity of claim 23, wherein the set of one or more port groups for at least one of the CSI-RS resources comprises nested port groups based on a number of ports included within each port group of the set of one or more port groups.

31. The scheduling entity of claim 30, wherein a first port group within the set of one or more port groups for a first CSI-RS resource of the plurality of CSI-RS resources comprises a first group of ports and a first number of ports and a second port group within the set of one or more port groups for the first CSI-RS resource comprises a second group of ports and a second number of ports less than the first number of ports, wherein the first group of ports comprises all of the second group of ports.

32. The scheduling entity of claim 23, wherein the means for selecting the CSI-RS resource from the plurality of CSI-RS resources and the port group from the set of one or more port groups of the CSI-RS resource for the scheduled entity of the set of one or more scheduled entities further comprises:
  means for selecting the port group from the set of one or more port groups of the CSI-RS resource based on a maximum number of ports supported by the scheduled entity.

33. The scheduling entity of claim 23, further comprising:
  means for configuring a set of one or more CSI-RS resource settings, each associated with a respective report setting indicating a type and periodicity of a report to be generated based on a measurement of the CSI-RS; and
  for each CSI-RS resource setting within the set of one or more CSI-resource settings, means for configuring a set of one or more CSI-RS resource sets, each indicating a configuration of the report or the measurement associated with the CSI-RS resource setting;
  wherein each CSI-RS resource set of the set of one or more CSI-RS resource sets comprises respective CSI-RS resources of the plurality of CSI-RS resources.

34. A method of wireless communication between a scheduled entity and a scheduling entity in a wireless communication network, the method comprising, at the scheduled entity:
  receiving an indication of a channel state information reference signal (CSI-RS) resource identifying a set of resource elements on which to receive a CSI-RS and a set of ports from which to receive the CSI-RS;
  receiving a port group indication of a port group, wherein the port group comprises a group of ports within the set of ports of the CSI-RS resource on which to perform channel estimation of a channel, wherein the group of ports comprises less than all of the set of ports;
  receiving the CSI-RS on all of the set of resource elements and all of the set of ports associated with the CSI-RS resource;
  calculating channel state information (CSI) on the group of ports within the port group indicated by the port group indication;
  measuring an interference measurement at least in part on other ports within the set of ports outside of the group of ports;
  transmitting the interference measurement to the scheduling entity; and
  transmitting the CSI to the scheduling entity.

35. The method of claim 34,
  wherein the interference measurement comprises a non-zero-power (NZP) interference measurement.

36. The method of claim 34, further comprising:
  receiving a respective set of one or more port groups for each of a plurality of CSI-RS resources.

37. The method of claim 36, wherein receiving the respective set of one or more port groups for each of the plurality of CSI-RS resources further comprises:
  receiving the respective set of one or more port groups for each of the plurality of CSI-RS resources within a radio resource control (RRC) message.

38. The method of claim 34, wherein receiving the indication of the CSI-RS resource and receiving the port group indication further comprises:
  receiving the indication of the CSI-RS resource and the port group indication within downlink control information (DCI) of a physical downlink control channel (PDCCH).

39. The method of claim 38, wherein receiving the port group indication further comprises:
  receiving a port group subset within the set of one or more port groups for the CSI-RS resource that comprises the port group within a media access control (MAC) control element (CE); and
  receiving the port group indication within the DCI of the PDCCH.

40. The method of claim 34, wherein receiving the indication of the CSI-RS resource and receiving the port group indication further comprises:
  receiving the indication of the CSI-RS resource and the port group indication within a radio resource control (RRC) message or a MAC CE.

41. A scheduled entity in wireless communication with a scheduling entity in a wireless communication network, comprising:

a processor;
a transceiver communicatively coupled to the processor; and
a memory communicatively coupled to the processor, wherein the processor is configured to:
 receive an indication of a channel state information reference signal (CSI-RS) resource identifying a set of resource elements on which to receive a CSI-RS and a set of ports from which to receive the CSI-RS via the transceiver;
 receive a port group indication of a port group, wherein the port group comprises a group of ports within the set of ports of the CSI-RS resource on which to perform channel estimation of a channel via the transceiver, wherein the group of ports comprises less than all of the set of ports;
 receive the CSI-RS on all of the set of resource elements and all of the set of ports associated with the CSI-RS resource via the transceiver;
 calculate channel state information (CSI) on the group of ports within the port group indicated by the port group indication;
 measure an interference measurement at least in part on other ports within the set of ports outside of the group of ports;
 transmit the interference measurement to the scheduling entity; and
 transmit the CSI to the scheduling entity via the transceiver.

42. The scheduled entity of claim 41, wherein the interference measurement comprises a non-zero-power (NZP) interference measurement.

43. The scheduled entity of claim 41, wherein the processor is further configured to:
 receive a respective set of one or more port groups for each of a plurality of CSI-RS resources.

44. The scheduled entity of claim 43, wherein the processor is further configured to:
 receive the respective set of one or more port groups for each of the plurality of CSI-RS resources within a radio resource control (RRC) message.

45. The scheduled entity of claim 41, wherein the processor is further configured to:
 receive the indication of the CSI-RS resource and the port group indication within downlink control information (DCI) of a physical downlink control channel (PDCCH).

46. The scheduled entity of claim 45, wherein the processor is further configured to:
 receive a port group subset within the set of one or more port groups for the CSI-RS resource that comprises the port group within a media access control (MAC) control element (CE); and
 receive the port group indication within the DCI of the PDCCH.

47. The scheduled entity of claim 41, wherein the processor is further configured to:
 receive the indication of the CSI-RS resource and the port group indication within a radio resource control (RRC) message or a MAC CE.

48. A scheduled entity in wireless communication with a scheduling entity in a wireless communication network, the scheduled entity comprising:
 means for receiving an indication of a channel state information reference signal (CSI-RS) resource identifying a set of resource elements on which to receive a CSI-RS and a set of ports from which to receive the CSI-RS;
 means for receiving a port group indication of a port group, wherein the port group comprises a group of ports within the set of ports of the CSI-RS resource on which to perform channel estimation of a channel, wherein the group of ports comprises less than all of the set of ports;
 means for receiving the CSI-RS on all of the set of resource elements and all of the set of one or more ports associated with the CSI-RS resource;
 means for calculating channel state information (CSI) on the group of ports within the port group indicated by the port group indication;
 means for measuring an interference measurement at least in part on other ports within the set of ports outside of the group of ports;
 means for transmitting the interference measurement to the scheduling entity; and
 means for transmitting the CSI to the scheduling entity.

49. The scheduled entity of claim 48,
 wherein the interference measurement comprises a non-zero-power (NZP) interference measurement on.

50. The scheduled entity of claim 48, further comprising:
 means for receiving a respective set of one or more port groups for each of a plurality of CSI-RS resources.

51. The scheduled entity of claim 50, wherein the means for receiving the respective set of one or more port groups for each of the plurality of CSI-RS resources further comprises:
 means for receiving the respective set of one or more port groups for each of the plurality of CSI-RS resources within a radio resource control (RRC) message.

52. The scheduled entity of claim 48, wherein the means for receiving the indication of the CSI-RS resource and receiving the port group indication further comprises:
 means for receiving the indication of the CSI-RS resource and the port group indication within downlink control information (DCI) of a physical downlink control channel (PDCCH).

53. The scheduled entity of claim 52, wherein the means for receiving the port group further comprises:
 means for receiving a port group subset within the set of one or more port groups for the CSI-RS resource that comprises the port group within a media access control (MAC) control element (CE); and
 means for receiving the port group indication within the DCI of the PDCCH.

54. The scheduled entity of claim 48, wherein the means for receiving the indication of the CSI-RS resource and receiving the port group indication further comprises:
 means for receiving the indication of the CSI-RS resource and the port group indication within a radio resource control (RRC) message or a MAC CE.

* * * * *